United States Patent
Kleinschmidt et al.

(10) Patent No.: US 6,567,451 B2
(45) Date of Patent: *May 20, 2003

(54) NARROW BAND EXCIMER OR MOLECULAR FLUORINE LASER HAVING AN OUTPUT COUPLING INTERFEROMETER

(75) Inventors: Juergen Kleinschmidt, Weissenfels (DE); Peter Lokai, Bovenden (DE)

(73) Assignee: Lambda Physik AG, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/098,236

(22) Filed: Mar. 15, 2002

(65) Prior Publication Data

US 2002/0141474 A1 Oct. 3, 2002

Related U.S. Application Data

(63) Continuation of application No. 09/715,803, filed on Nov. 17, 2000.
(60) Provisional application No. 60/195,169, filed on Apr. 6, 2000, provisional application No. 60/166,854, filed on Nov. 22, 1999, and provisional application No. 60/166,277, filed on Nov. 18, 1999.

(51) Int. Cl.$^7$ .................................................. H01S 3/22
(52) U.S. Cl. .......................... 372/57; 872/92; 872/99; 872/108; 872/88
(58) Field of Search ............................ 372/57, 95, 92, 372/98, 99, 108

(56) References Cited

U.S. PATENT DOCUMENTS 3,471,800 A  10/1969  Congleton et al. ......... 331/94.5

(List continued on next page.)

FOREIGN PATENT DOCUMENTS

| DE | 298 22 090 U 1 | 3/1999 | ............ H01S/3/08 |
|---|---|---|---|
| DE | 299 07 349 U 1 | 8/2000 | ............ H01S/3/086 |
| EP | 1 041 689 A1 | 10/2000 | ......... H01S/3/1055 |
| EP | 1 102 368 A2 | 5/2001 | ............ H01S/3/081 |
| EP | 1 119 083 A2 | 7/2001 | ............ H01S/3/08 |
| JP | 60 16479 | 1/1985 | ............ H01S/3/081 |
| JP | 8 274399 | 11/1986 | ............ H04S/3/104 |
| JP | 62 160783 | 7/1987 | ............ H01S/3/115 |
| JP | 2 152288 | 6/1990 | ............ H01S/3/106 |

OTHER PUBLICATIONS

Finkelstein et al., "A Rectilinear Transmission Grating and Applications," *JOSA*, vol. 43., 1953., pp. 335.

(List continued on next page.)

*Primary Examiner*—Leon Scott, Jr.
(74) *Attorney, Agent, or Firm*—Sierra Patent Group, Ltd.; Andrew V. Smith

(57) ABSTRACT

An excimer or molecular fluorine laser includes a discharge chamber filled with a gas mixture, multiple electrodes within the discharge chamber connected to a power supply circuit for energizing the gas mixture, and a resonator including the discharge chamber and a pair of resonator reflectors for generating an output laser beam. One of the resonator reflectors is an output coupling interferometer including a pair of opposing reflecting surfaces tuned to produce a reflectivity maximum at a selected wavelength for narrowing a linewidth of the output laser beam. One of the pair of opposing reflecting surfaces is configured such that the opposing reflecting surfaces of the interferometer have a varying optical distance therebetween over an incident beam cross-section which serves to suppress outer portions of the reflectivity maximum to reduce spectral purity. Preferably, this surface is non-planar, and may include a step, a recess or a raised or recessed curved portion of a quarter wavelength in height or depth, respectively.

34 Claims, 11 Drawing Sheets

U.S. PATENT DOCUMENTS

| | | | |
|---|---|---|---|
| 3,546,622 A | 12/1970 | Peterson et al. | 331/94.5 |
| 3,609,586 A | 9/1971 | Danielmeyer et al. | 331/94.5 |
| 3,609,856 A | 10/1971 | Eckert | 29/473.1 |
| 3,868,592 A | 2/1975 | Yarborough et al. | 331/94.5 |
| 4,393,505 A | 7/1983 | Fahlen | 372/57 |
| 4,399,540 A | 8/1983 | Bucher | 372/28 |
| 4,477,909 A * | 10/1984 | Salvi et al. | 372/98 |
| 4,611,270 A | 9/1986 | Klauminzer et al. | 364/183 |
| 4,616,908 A | 10/1986 | King | 350/576 |
| 4,691,322 A | 9/1987 | Nozue et al. | 372/82 |
| 4,696,012 A | 9/1987 | Harshaw | 372/99 |
| 4,803,696 A | 2/1989 | Pepper et al. | 372/95 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,926,428 A | 5/1990 | Kajiyama et al. | 372/20 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 5,025,445 A | 6/1991 | Anderson et al. | 372/20 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,221,823 A | 6/1993 | Usui | 219/121.78 |
| 5,226,050 A | 7/1993 | Burghardt | 372/20 |
| 5,337,330 A | 8/1994 | Larson | 372/86 |
| 5,373,515 A | 12/1994 | Wakabayashi et al. | 372/20 |
| 5,396,514 A | 3/1995 | Voss | 372/57 |
| 5,404,366 A | 4/1995 | Wakabayashi et al. | 372/29 |
| 5,406,571 A | 4/1995 | Bucher et al. | 372/20 |
| 5,440,574 A | 8/1995 | Sobottke et al. | 372/34 |
| 5,440,578 A | 8/1995 | Sandstrom | 372/59 |
| 5,450,207 A | 9/1995 | Fomenkov | 356/416 |
| 5,479,431 A | 12/1995 | Sobottke et al. | 372/92 |
| 5,532,880 A | 7/1996 | Robb | 359/665 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |
| 5,625,499 A | 4/1997 | Chen | 359/831 |
| 5,646,954 A | 7/1997 | Das et al. | 372/55 |
| 5,652,671 A | 7/1997 | Knipe et al. | 359/831 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,761,236 A | 6/1998 | Kleinschmidt et al. | 372/100 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/50 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,346 A | 11/1999 | Mizuno et al. | 369/112 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,016,479 A | 1/2000 | Taricani, Jr. | 705/19 |
| 6,018,537 A | 1/2000 | Hofmann et al. | 372/25 |
| 6,020,723 A | 2/2000 | Desor et al. | 320/166 |
| 6,028,872 A | 2/2000 | Partlo et al. | 372/38 |
| 6,028,879 A | 2/2000 | Ershov | 372/57 |
| 6,028,880 A | 2/2000 | Carlesi et al. | 372/58 |
| 6,061,382 A | 5/2000 | Govorkov et al. | 372/101 |
| 9,276,057 | 5/2000 | Levesque et al. | 356/349 |
| 6,128,323 A | 10/2000 | Myers et al. | 372/38 |
| 6,137,821 A | 10/2000 | Ershov | 372/108 |
| 6,153,886 A | 11/2000 | Hagiwara et al. | 250/548 |
| 6,154,470 A | 11/2000 | Basting et al. | 372/19 |
| 6,240,110 B1 | 5/2001 | Ershov | 372/20 |
| 6,421,365 B1 * | 7/2002 | Kleinschmidt et al. | 372/108 |
| 2001/0028456 A1 | 10/2001 | Nishi | 356/400 |

OTHER PUBLICATIONS

Watts, J.K., "Theory of Multiplate Resonant Reflectors," *Applied Optics*, Aug. 1968, vol. 7, No. 8., pp. 1521–1523.

M. Born, et al., Principles of Optics, at p. 325, Pergamon, 1970.

Bloom, A.L., "Modes of a Laser Resonator Containing Tilted Birefringent Plates," *Journal of the Optical Society of America*, vol. 64, No. 4, Apr. 1974.

Okada, M., et al., "Electronic Tunig of Dye Lasers by an Electrooptic Birefringent Fabry–Perot Etalon," *Optics Communications*, vol. 14, No. 1, May 1975.

Rice, J.K., "VUV Emissions from Mixtures of F2 and the Noble Gasses—A Molecular F2 laser at 1575 Aa)," *Applied Physics Letters*, vol. 31, No. 1, Jul. 1, 1977.

Saika, S., "Nitrogen–Laser–Pumped Single–Mode Dye Laser," *Applied Physics*, 1978.

Woodworth, J.R., ete al., "An Efficient, High Power F2 Laser Near 157 nma)," *The Journal of Chemical Physics*, vol. 69, Sep. 15, 1978.

S. Sumida, et al., "Novel Neutral Atomic Fluorine Laser Lines in a High–pressure Mixture of F2 and He," *Journal of Applied Physics*, vol. 50, No. 6, Jun. 1979.

Plummer, H., et al., "Discharge Pumped F2 Laser at 1580 A", *Optics Communications*, vol. 28, No. 1, Jan. 1979.

Hohla, K., et al., "CIF and F2: Two New Ultra–violet Laser Systems," *Optics and Laser Technology*, vol. 11, No. 6, Dec. 1979.

Hutchinson, M.H.R., "Vacuum Ultraviolet Excimer Lasers," *Applied Optics VUV VI*, vol. 19, No. 23, Dec. 1, 1980, pp. 3883–3888.

R. Sadighi–Bonabi, et al., "Gain and Saturation of the Atomic Fluorine Laser," *Journal of Applied Physics*, vol. 53, No. 5, May 1982.

S. Marcus, "Cavity Dumping and Coupling Modulation of an Etalon–Coupled CO2 Laser," *J. Appl. Phys.*, vol. 63, No. 9, Sep. 1982.

Koprinkov, I.G., et al., "Intense Laser Generation from an Atomic–Fluorine," *Applied Physics*, vol. B33, No. 4, Apr. 1984.

A.C. Cefalas, et al., "Gain Measurements at 157 nm in an F2 Pulsed Discharge Molecular Laser," *Optics Communications*, vol. 55, No. 6, Oct. 15, 1985.

E. Armandillo, et al., "Simple, Compact, High–repetition Rate XeCI Laser," *Review of Scientific Instruments*, vol. 56, No. 5, Part 1, May 1985.

McKee, T., "Spectral–narrowing Techniques for Excimer Laser Oscillators," *Can J Phys*, 1985, vol. 63., pp. 214–219.

V.N. Ishchenko, et al., "High–power Efficient Vacuum Ultraviolet F2 Laser Excited by an Electric Discharge," *Soviet Journal of Quantum Electronics*, vol. 16, No. 5, May 1986.

ZOS, Akademie der Wissenschaften der DDR, Zentralinstitut fur Optik und Wissenschaften der DDR, Oct. 1987, "Leistungastarker atomarer Fluorlaser im roten Spektralbereich," Jurgen Lademann, Roland Kunig, Wadim Saidow, Rainer Weidauer.

H. Lengfellner, et al., "Generation of Tunable Pulsed Microwave Radiation by Nonlinear Interaction of Nd:YAG Laser Radiation in GaP Crystals,"*Optics Letters*, vol. 12, No. 3, Mar. 1987.

Wani, K., et al., Narrow–band KrF Excimer Laser—Tunable and Wavelength Stabilized, *SPIE—The International Society for Optical Engineering, Excimer Beam Applications*, vol. 998, Sep. 1988, Boston, Massachusetts.

Uematsu, T, et al., "Theoretical Simulation of a Discharge–pumped F2 Excimer Laser," *Discharge–Pumped Excimer Laser Research in Japan*, Apr. 1988.

McKee, T.J., et al., "Line–narrowed Industrial Excimer Laser for Microlithography," *Conference on Lasers and Electro–Optics, 1989 Technical Digest Series*, vol. 11, Apr. 24–29, 1989, Baltimore, Maryland.

Yamada, K.,et al., "High Power Discharge–pumped F2 Laser," *Lasers and Electro–Optics Society Annual Meeting Conference Proceedings, Leos '89*, Oct. 17–20, 1989.

Yamada, K., et al., "High–power Discharge–pumped F2 Molecular Laser," *Applied Physics Letters*, vol. 54, vol. 7, Feb. 13, 1989.

Wataru Sasaki, et al., "Intense VUV–XUX Generation from Rare Gas Excimers," *Conference on Lasers and Electro–Optics, 1989 Technical Digest Series*, vol. 11, May 24–28, 1989.

Shaw, "Excimer Laser Resonator," Shaw, "Excimer Laser Resonator," *Physics and Technology of Laser Resonators*, Bristol New York, 1989, pp. 244–245.

Magni, Resonator with Variable Reflectivity Mirrors, in Shaw, at pp. 94–105.

Science Report, Lambda Physik, No. 3, Nov. 1990, "Breakthrough in F2 Laser Technology" pp. 1–4.

F. Voss, "Optimierung der VUV–Emission bei 157 nm (F2–Linie) bei Entladungs—gepemten Excimerlasern," *Verhanlungen*, Mar. 1990, Physikertagung Munchen 1990., pp. 450–451.

Kakehata, M., "High Specific Output Energy Operation of a Vacuum Ultraviolet Molecular Fluorine Laser Excited at 66 MW/cm3 by an Electric Discharge," *Applied Physics Letters*, vol. 56, No. 26.

Kakehata, M., et al., "Frequency up–conversion of a Discharge Pumped Molecular Fluorine Laser by Stimulated Raman Scattering in H2," *Gas Flow and Chemical Lasers, SPIE*, vol. 1397, Sep. 10–14, 1990.

K. Komatsu, et al., "Spectroscopic Comparison Between Low and High Pressure Discharge Pumped Xe Atomic Lasers," *Conference on Lasers and Electro–optics, 1990 Technical Digest Series*, vol. 7, May 21–25, 1990.

C. Skordoulis, et al., "Amplification Characteristics of a Discharge Excited F2 Laser," *Journal of Modern Optics*, vol. 37, No. 4, Apr. 1990.

Traub, W., "Constant–dispersion Grism Spectrometer for Channeled Spectra," *Optical Society of America*, Sep. 1990, vol. 7., No. 9., pp. 1779–1791.

Highlights, Lambda Physik, No. 29, Jun. 1991, "VUV Spectroscopy by Frequency Trippling" pp. 1–6.

Momma, C., "Stimulated Raman Scattering of a F2–Laser in H2," *Institut Fur Quantenopik*, Oct. 22, 1991.

Tagungsband, Vom. 24, Bis. 26, Sep. 1991, Abstract: "Vakuum UV Molekullaser mit hoher Ausgangsleistung" 3 pages.

Kakehata, M., "Efficiency Characterization of Vacuum Ultraviolet Molecular Fluorine (F2) Laser (157nm) Excited by an Intense Electric Discharge," *IEEE Journal of Quantum Electronics*, Nov. 1991, vol. 27, No. 11.

Highlights, Lambda Physik, No. 33, Feb. 1992, "VUV Strokes and Anti–Stokes Raman Lines Derived from an F2 Laser" 5 pages.

S.M. Hooker, et al., "Influence of Cavity Configuration on the Pulse Energy of a High–Pressure Molecular Fluorine Laser," *Applied Physics B Photo–physics and Laser Chemistry*, vol. 1, 1992.

Bastiaens, H.M.J., et al., "Small–signal Gain Measurements in an Electron Beam Pumped F2 Laser," *Applied Physics Letters*, vol. 63, No. 4, Jul. 26, 1993.

Highlights Lambda Physik, Apr. 1993, "Excimer Laser Based Microstructuring Using Mask Projection Technique," U. Sarbach.

High Power Laser & Particle Beams, vol. 6, no. 4, Series No. 24, Nov. 15, 1994, 12 pages in Japanese.

Highlights, Lambda Physik, No. 43, Jan. 1994, "Photochemical Modification of Fluorocarbon Resin to Generate Adhesive Properties" pp. 1–6.

F.T.J.L. Lankhorst, et al., "Long Pulse Electron Beam Pumped Molecular F2–Laser," *Journal of Applied Physics*, vol. 77, Jan. 1–15, 1995.

Demtroder, W., Laser Spectroscopy Springer, *Berlin Heidelberg*, 1996, pp. 99–221.

Ohwa, M., "Theoretical Evaluation of High–Efficiency Operation of a Discharge–pumped Vacuum–ultraviolet F2 Lasers," *Applied Optics Letters*, vol. 51, No. 13, Sep. 28, 1997.

Kitamura, et al., "Small–signal Gain Measurements in a Discharge–pumped F2 Laser," *Journal of Applied Physics*, vol. 81, No. 6, Mar. 1997, pp. 2523–2528.

Giuri, et al., "Output Coupler Design of Unstable Cavities for Excimer Lasers," *Optics*, 1997, 1143–1148.

Hultzsch, R., "Gitterprismen," *Photonik*, Sep. 1998., pp. 40–41. This publication is in German.

Geyer et al., Double Gratings–Prism, Astr. Astraphys., vol. 148., pp. 312–316, 1985.

Kakehata, M. et al., "CTUH15 Experimental Study of Tunability of a Discharge Pumped Molecular Fluorine Laser," *CLEO 90/Tuesday Poster*, pp. 106–108, 1990.

\* cited by examiner

NARROW BAND EXCIMER OR MOLECULAR FLUORINE LASER HAVING AN OUTPUT COUPLING INTERFEROMETER

PRIORITY

This Application is a rule 53(b) continuation of and which claims the benefit of priority to U.S. patent application Ser. No. 09/715,803, filed Nov. 17, 2000, which claims the benefit of priority to U.S. Provisional Patent Applications Nos. 60/195,169, filed Apr. 6, 2000, 60/166,854, filed Nov. 22, 1999, and 60/166,277, filed Nov. 18, 1999.

BACKGROUND OF THE INVENTION

1. Field of the Invention

The invention relates to narrow band lasers and particularly to an excimer or molecular fluorine laser having output coupling interferometer.

2. Discussion of the Related Art

Narrow band excimer lasers ($\lambda$=193 nm, 248 nm) are applied in photolithographic applications for production of integrated circuits. Excimer laser radiation is used for making structures in the dimensional range of <0.18–0.25 $\mu$m (KrF-laser radiation) or <0.13–0.18 $\mu$m (ArF-laser radiation). The molecular fluorine laser emitting around 157 nm ($F_2$-laser) is being developed for feature sizes <0.13 $\mu$m. Achromatic imaging optics are difficult to produce for this wavelength region. For this reason radiation of narrow bandwidth is desired to control imaging errors caused by chromatic aberration. Acceptable bandwidths are typically less than 0.6 pm.

Another important beam parameter is the spectral purity, or the bandwidth which contains 95% of the output pulse energy. High numerical aperture (NA) optics use <1 pm bandwidth radiation. This can achieved by using of two spectral narrowing elements such as a grating and intracavity etalon or etalon output coupler.

Etalon outcoupling mirrors have been used for a long time and in various different types of lasers. A simple example of a plane—plane cavity for an excimer laser can be formed by a highly reflective (HR) back-mirror and an uncoated solid etalon as an outcoupling resonator reflector.

U.S. Pat. Nos. 5,901,163 and 5,856,991 each to Ershov relate to a resonator including an etalon output coupler for a narrow band excimer laser, as shown in FIG. 1 (which is FIG. 3 of the '991 patent). The resonator consists of a line narrowing module (18) consisting of an echelle grating and a prism beam expander, and a plane-parallel air spaced etalon (44) as an outcoupling mirror.

The echelle grating based line narrowing module produces a laser beam having a spatial variation in wavelength (chirp) along a beam cross section direction (direction of dispersion). FIG. 2 shows a typical spatial distribution of a laser spectrum across the beam created by the grating. The laser resonator used for generating the spectrum in FIG. 2 consists of an echelle grating, prism beam expander and a typical partially reflecting outcoupling mirror having a reflectivity of, e.g., 20–25%.

Thus, for the arrangement of FIG. 1, the line narrowing module (18) provides a spatial distribution of wavelengths at the outcoupling etalon that is approximately given by:

$$\lambda(x)=\lambda(0)+(d\lambda/dx)x \qquad \text{(equation 1)};$$

where x is the coordinate along the short beam axis, and x=0 is the beam center. For the example depicted in FIG. 2, the "spatial chirp" is $d\lambda/dx \approx 0.83$ pm/mm. This value depends on the linear dispersion of the echelle grating and the laser design (i.e., the distance between the grating and outcoupling etalon, the discharge width, etc.).

FIGS. 3a, 3b show two calculated spatial distributions of laser spectra for two different gratings ($d\lambda/dx$=0.83 pm/mm and 1.24 pm/mm), an airspaced plane-parallel uncoated etalon with FSR=1.6 pm as outcoupler and otherwise the same resonator designs. FIG. 3c shows the measured spectrum for a grating with $d\lambda/dx$=1.24 pm/mm and an outcoupler etalon with FSR=1.6 pm. The calculations are in a good agreement with the experimental findings (i.e., compare FIGS. 3b and 3c).

To avoid "side modes" the following relation is fulfilled:

$$(d\lambda/dx)\cdot b \leq 0.5\ FSR \qquad \text{(equation 2)};$$

where b is the beam width in front of the etalon. Higher values for $d\lambda/dx$ can be achieved by using more highly dispersive gratings, or bending the grating such as is disclosed in U.S. Pat. No. 5,095,492 to Sandstrom. As it is desired to produce still smaller structures on silicon substrates, it is desired to further reduce the spectral purity of excimer laser exposure beams.

SUMMARY OF THE INVENTION

It is therefore an object of the invention to provide a narrow band excimer or molecular fluorine laser having improved spectral purity.

In accordance with this object, an excimer or molecular fluorine laser is provided including a discharge chamber filled with a gas mixture, multiple electrodes within the discharge chamber connected to a power supply circuit for energizing the gas mixture, and a resonator including the discharge chamber and a pair of resonator reflectors for generating an output laser beam. One of the resonator reflectors is an output coupling interferometer including a pair of opposing reflecting surfaces tuned to produce a reflectivity maximum at a selected wavelength for narrowing a linewidth of the output laser beam.

In a first aspect of the invention, one of the pair of opposing reflecting surfaces is configured such that the opposing reflecting surfaces of the interferometer have a varying optical distance therebetween over an incident beam cross-section which serves to suppress outer portions of the reflectivity maximum to reduce spectral purity. Preferably, this surface is non-planar, and may include a step, a recess or a raised or recessed curved portion of a quarter wavelength in height or depth, respectively.

In a second aspect of the invention, the laser includes a first photodetector and a beam splitter. The beam splitter is positioned to reflect a portion of the beam reflected from the output coupling interferometer to the photodetector. The interferometer is tuned substantially to a maximum intensity of interference fringes reflecting therefrom. Preferably, a second photodetector and a second beam splitter are positioned to monitor the beam transmitted through the output coupling interferometer. Information detected at the second photodetector is used by a processor for maximizing an energy stability of the transmitted beam.

In a third aspect of the invention, an etalon spectrometer is positioned to detect spectral information of the beam transmitting through the output coupling interferometer. The output coupling interferometer is tuned to produce a maximum intensity of interference fringes of the etalon spectrometer.

In a fourth aspect of the invention, a position sensitive photodetector and a beam splitter are included. The beam splitter is positioned to reflect a portion of the beam reflected from the output coupling interferometer to the position sensitive photodetector. The output coupling interferometer is tuned substantially to a maximum intensity of reflection interference fringes. Preferably, a second photodetector and a second beam splitter are also included, wherein information is detected at the second photodetector of the beam transmitted through the interferometer and used by a processor for maximizing energy stability of the transmitted beam.

In a fifth aspect of the invention, the output coupling interferometer is disposed within a housing. A pressure control unit controls a pressure within the housing and between the first and second opposing reflecting surfaces of the interferometer. The pressure control unit preferably included an inert gas filled bellows fluidly coupled with the housing. The interior volume of the bellows is adjustable for adjusting the pressure within the housing and between the first and second opposing reflecting surfaces of the output coupling interferometer.

In a sixth aspect of the invention, a beam expander is disposed before the output coupling interferometer. The beam expander reduced the divergence of the beam incident at the interferometer, the resolution of the interferometer is improved, and the spectral purity is improved in accord with the object of the invention. The beam expander may include one or more beam expanding prisms or a lens arrangement.

BRIEF DESCRIPTION OF THE DRAWINGS

FIG. 4c shows a calculated spectrum of a KrF excimer laser including the first output coupling interferometer of FIG. 4a.

FIG. 5c shows a calculated spectrum of a KrF excimer laser including the third output coupling interferometer of FIG. 5a.

FIG. 6c shows a calculated spectrum of a KrF excimer laser including the fifth output coupling interferometer of FIG. 5a.

INCORPORATION BY REFERENCE

Figure 1:
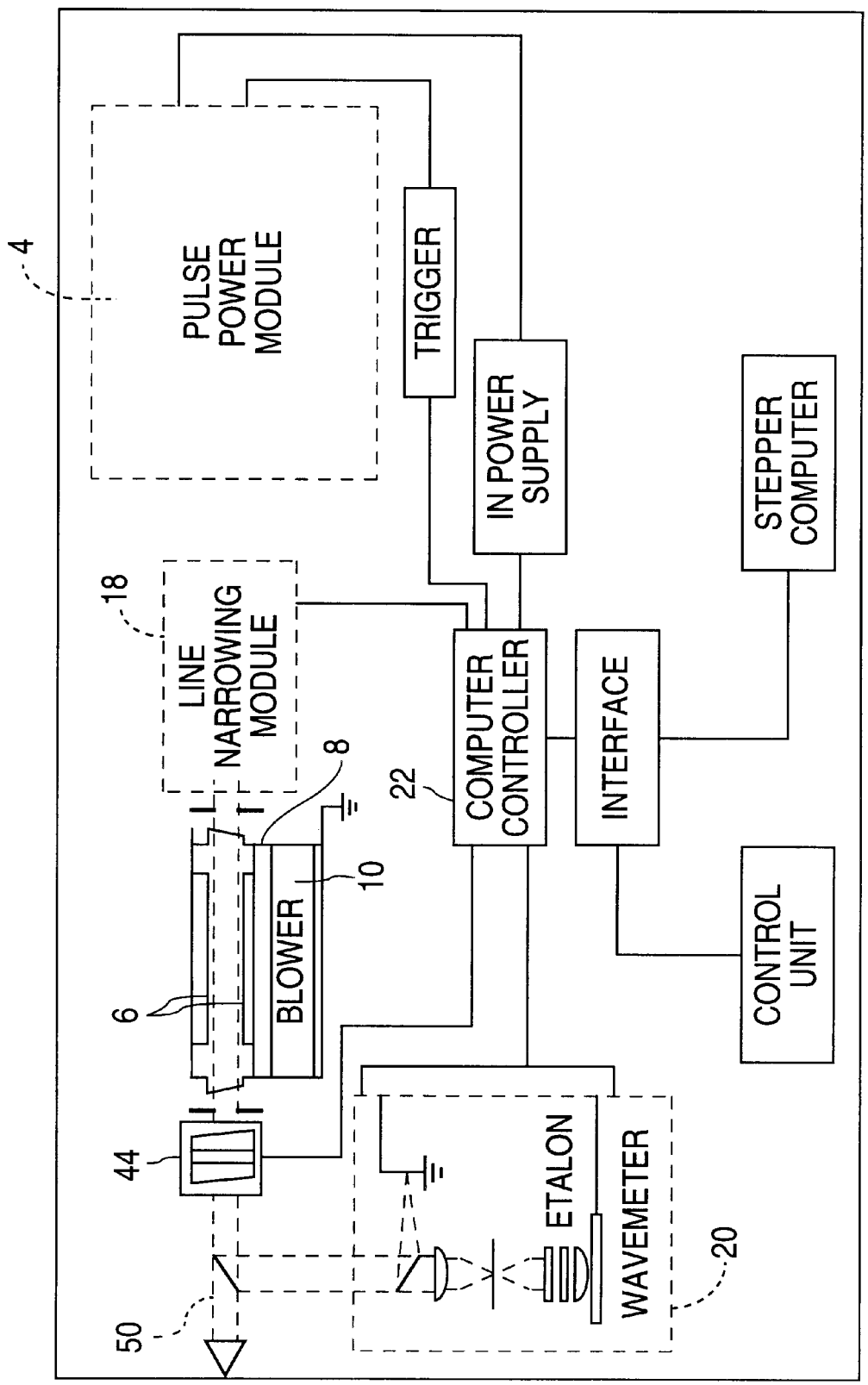
FIG. 1 schematically shows a conventional narrow band excimer laser including a grating-based line-narrowing module and an etalon output coupler.
Figure 2:
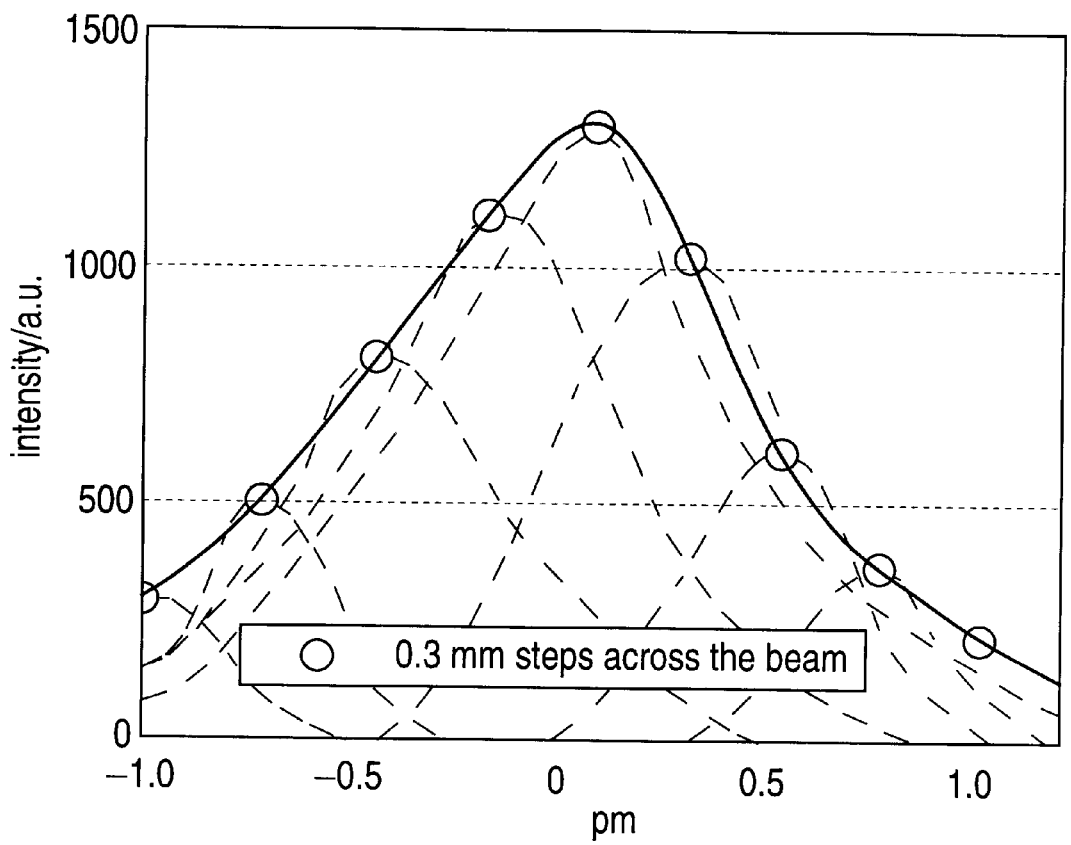
FIG. 2 shows a spatial distribution of a laser spectrum for a narrow band laser having a conventional partially reflecting output coupling mirror.

What follows is a cite list of references each of which is, in addition to those references cited above and below, and including that which is described in the related art description and in the priority section, and the above invention summary, and the abstract below, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below and within the scope of the present invention. Further patent, patent application and non-patent references are cited in the written description and are also incorporated by reference into the detailed description of the preferred embodiment with the same effect as just described with respect to the following references:

German Utility Model No. 299 07 349.1;

U.S. Pat. Nos. 5,901,163, 5,856,991, 6,028,879, 5,559,816, 4,977,563, 4,611,270, 6,061,382, 5,406,571, 5,852,627, 3,609,856, 5,095,492 3,471,800, 3,546,622, 5,440,574, and 5,479,431;

Japanese patents no. 8-274399, 2-152288, 60-16479, and 62-160783;

S. Marcus, Cavity Dumping and Coupling Modulation of an Etalon-Coupled $CO_2$ Laser, J. Appl. Phys., Vol. 63, No. 9 (September 1982);

H. Lengfellner, Generation of Tunable Pulsed Microwave Radiation by Nonlinear Interaction of Nd:YAG Laser Radiation in GaP Crystals, Optics Letters, Vol. 12, No. 3 (March 1987);

W. Born and E. Wolf, Principles of Optics, at p. 325, Pergamon (1970);

Shaw, Excimer Laser Resonators, Physics and Technology of Laser Resonators, at pp237–245, Bristol N.Y. (1989)

Magni, Resonators with Variable Reflectivity Mirrors, in Shaw, at pp.94–105, see above;

Giuri et al, Appl. Opt. 26,1143 (1997);

U.S. patent application Ser. Nos. 60/178,445, 09/317,527, 09/317,695, 09/130,277, 09/244,554, 09/454,803, 60/212, 183, 09/657,396, 09/484,818, 09/599,130, 09/602,184, 09/629,256, 60/173,993, 60/166,967, 60/170,919, 60/200,163, 60/215,933 and 60/235,116, each of which is assigned to the same assignee as the present application.

DETAILED DESCRIPTION OF THE PREFERRED EMBODIMENTS

The preferred embodiments below describe an output coupling interferometer designed to suppress the "side modes" of an excimer or molecular fluorine laser output beam. The preferred embodiments describe preferred outcoupling devices that serve as a combination of a spectral purity reducing optical element and a divergency reducing optical element. The effect of the output coupling interferometric devices described below can be mathematically derived by modifying calculations relating to an air-spaced optical etalon. Such an etalon comprises a pair of plane-parallel reflecting surfaces separated by an air gap (wherein inert gases typically reside in the "air" gap). The reflectivity formula for an air-spaced etalon can be found in physics textbooks like Born "Optics":

$$R = 4R_0 \sin^2\delta / ((1-R_0)^2 + 4R_0 \sin^2\delta) \quad \text{(equation 3)};$$

where $\delta = (2\pi/\lambda)d$, d is the spacer thickness or separation between the plates of the etalon, and $R_0$ is the reflectivity of the etalon mirrors.

Maximum reflectivity is achieved for $\delta = (m \pm \frac{1}{2})\pi$ or $(m \pm \frac{1}{2}) \lambda/2 = d_1$. Reflectivity $R=0$ is achieved for $\delta = m\pi$ or $m \lambda/2 = d_2$ (m-integer). The plate separation difference for these two cases is given by $d_1 - d_2 = \pm \lambda/4$. Etalon plates can also have curved reflecting surfaces as long as their separation always remains constant (see S. Marcus, J. Appl. Phys. Vol. 53, No. 9 at 6029 (September 1982). In this case, the spacing between the two etalon plates at the center of the beam cross section x=0 and across the spatial extent of the plates may be set to get $R = R_{max}$. The arrangement can be modified from this etalon configuration where the spacing remains constant over the spatial extent of the plates such that the spacing is varied. In this modified interferometric configuration, at some lateral position "x" where the spacing decreases (or increases) by $\lambda/4$ (or the phase changes by $\pm \pi/2$), the reflectivity R is zero.

Now we can take into consideration the wavelength chirp $(d\lambda/dx \neq 0)$. We set the maximum reflectivity at the beam center x=0 and zero reflectivity at that x-position where according to equation 1, $\lambda(x) - \lambda(0) \approx$ FSR, or free spectral range of the etalon (measured in wavelength units). We get:

$$d(x)/(1+FSR/\lambda(0)) - d(0) = \pm \lambda(0)/4 \quad \text{(equation 4)}$$

or a phase change of $\delta(x)/(1+FSR/\lambda(0)) - \delta(0) = \pm \pi/2$. Some outcoupling interferometer arrangements can be designed by which equation 4 can be fulfilled as these are described below with reference to FIGS. 4a–6c, below.

In preferred embodiments, the material of the plates of the etalon of the present invention is calcium fluoride, magnesium fluoride, and/or fused silica, and alternatively barium fluoride, lithium fluoride and strontium fluoride.

In an alternative embodiment, a beam expander may be installed before the interferometers of any of the preferred embodiments described below to expand the beam in the x-direction. Such a beam expander may be one or more prisms or a pair of lenses. The inner surfaces of the etalon can be specially shaped using reactive ion etching (RIE), or simply ion beam etching.

Preferred Embodiment A

Figure 4A:
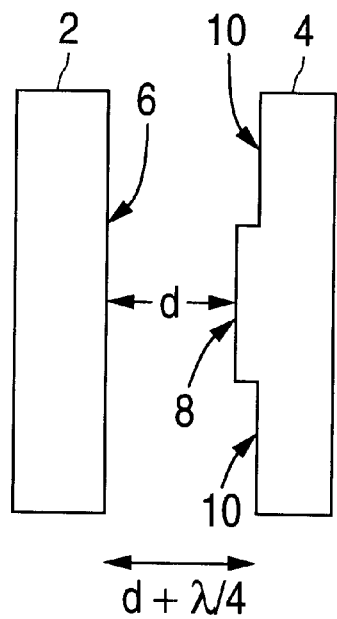
FIG. 4a schematically shows a first output coupling interferometer in accord with a first embodiment.
Figure 4B:
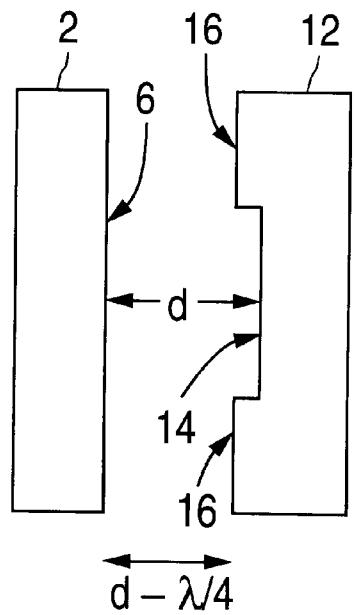
FIG. 4b schematically shows a second output coupling interferometer in accord with a second embodiment.

Preferred embodiment A is shown at FIGS. 4a and 4b. FIG. 4a shows an interferometer for use as an output coupling reflector for an excimer or molecular fluorine laser. The interferometer includes a pair of optical blocks 2 and 4. Reflecting surface 6 of optical block 2 opposes a central reflecting step surface 8 of optical block 4. Reflecting surface 6 of optical block 2 also opposes reflecting side surfaces 10 of optical block 4. The gap spacing d between central reflecting step surface 8 and the reflecting surface 6 is set for maximum reflectivity of an the excimer or molecular fluorine laser beam having a predetermined wavelength. The gap spacing is $d + \lambda/4$ between the reflecting surface 6 and the outer reflecting surfaces 10.

Alternative arrangements may include optical block 2 having the $\lambda/4$ step and optical block 4 having a planar reflecting surface, or each of optical blocks 2 and 4 having a $\lambda/8$ step. Other such alternative arrangements would be understood by those skilled in the art whereby the optical path difference between the reflectivity maximum portions and the reflectivity zero or suppressed portion or portions is $\lambda/4$.

FIG. 4b shows an alternative interferometer for use as an output coupling reflector for an excimer or molecular fluorine laser to that shown and described with respect to FIG. 4a. The interferometer of FIG. 4b includes a pair of optical blocks 2 and 12. Reflecting surface 6 of optical block 2 opposes a central reflecting recess surface 14 of optical block 12. Reflecting surface 6 of optical block 2 also opposes reflecting side surfaces 14 of optical block 12. The gap spacing d between central reflecting recess surface 14 and the reflecting surface 6 is set for maximum reflectivity of an the excimer or molecular fluorine laser beam having a predetermined wavelength. The gap spacing is $d - \lambda/4$ between the reflecting surface 6 and the outer reflecting surfaces 16.

Again, alternative arrangements may include optical block 2 having the $\lambda/4$ recess and optical block 12 having a planar reflecting surface, or each of optical blocks 2 and 12 having a $\lambda/8$ recess. Other such alternative arrangements are possible whereby the optical path difference between the reflectivity maximum portions and the reflectivity zero or suppressed portion or portions is $\lambda/4$.

Thus, preferred embodiment A is characterized in that the optical path length near the beam center differs by that at the outer regions by $\pm \lambda/4$. Preferably, this is achieved by forming additional coatings at the center region. the substrate of the blocks 2, 4 and/or 12 themselves may be formed with the step(s) or recess(es) described above. Other methods for providing step profiles are described at Giuri (see citation above) such as for use in unstable resonators.

The output coupling interferometer of preferred embodiment A exemplified at FIGS. 4a–4b preferably includes external surfaces of blocks 2, 4 and 12 with antireflection (AR) coatings. As mentioned, many modifications within the scope of preferred embodiment A are conceivable (e.g., two inner surfaces having equal phase jumps of $\pi/4$, or otherwise adding up to phase jumps of $\pi/2$ from the outer regions).

Figure 4C:
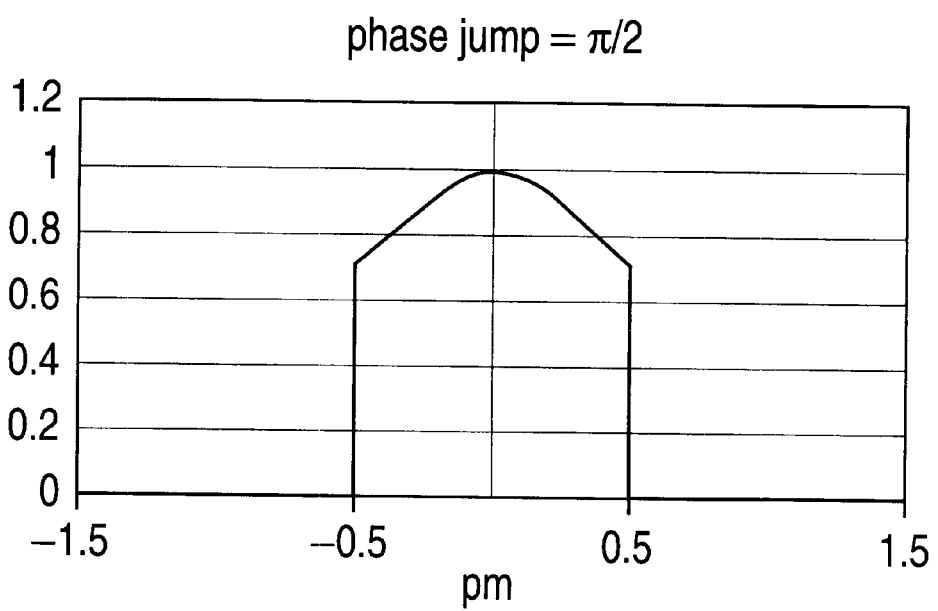

The calculated spectrum of a narrow band KrF-laser using an output coupling interferometer according preferred embodiment A is shown at FIG. 4c. The calculations provide a rough picture of the spectrum of the output beam that could be expected. Advantageously, sidebands are suppressed at the boundaries between the central surface 8 or 14 of FIGS. 4a and 4b to the side surfaces 10 and 16, respectively, thereby reducing the spectral purity of the beam in accordance with the object of the invention.

The following calculation is described for obtaining the spectrum shown at FIG. 4c for the embodiments of FIGS. 4a–4b:

We set maximum reflectivity $R_{max}$ at x=0

$$\Rightarrow \left(m \pm \frac{1}{2}\right)\frac{\lambda(0)}{2} = d(0) \quad (a)$$

and R=0, e.g., at the position x where e.g., $\lambda(x)=\lambda(0)+FSR$ $$\Rightarrow m\frac{\lambda(x)+FSR}{2} = d(x) \quad (b)$$

$$\frac{m\lambda(0)}{2}\left(1 + \frac{FSR}{\lambda(0)}\right) = d(x)$$

$$\frac{m\lambda(0)}{2} = \frac{d(x)}{\left(1 + \frac{FSR}{\lambda(0)}\right)} \quad (c)$$

(c)-(a) gives the requirement $$\frac{d(x)}{1 + \frac{FSR}{\lambda(0)}} - d(0) = \pm\frac{\lambda(0)}{4}$$

Preferred Embodiment B

Figure 5A:
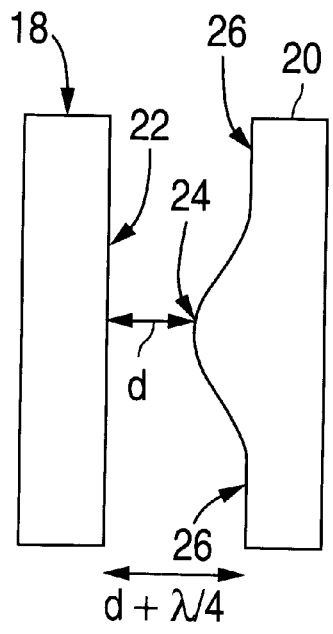
FIG. 5a schematically shows a third output coupling interferometer in accord with a third embodiment.
Figure 5B:
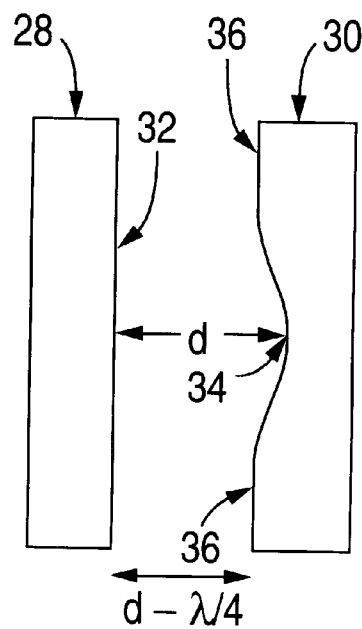
FIG. 5b schematically shows a fourth output coupling interferometer in accord with a fourth embodiment.

The preferred embodiment B is depicted at FIGS. 5a and 5b. FIG. 5a shows an interferometer for use as an output coupling reflector for an excimer or molecular fluorine laser. The interferometer includes a pair of optical blocks 18 and 20. Reflecting surface 22 of optical block 18 opposes a curved, raised central reflecting surface 24 of optical block 20. The curved, raised surface 24 is preferably symmetrical about its center and is further preferably Gaussian in shape. Reflecting surface 22 of optical block 18 also opposes reflecting side surfaces 26 of optical block 20. The gap spacing d between the center, or peak, of curved, raised central reflecting surface 24 and the reflecting surface 22 is preferably set for maximum reflectivity of an the excimer or molecular fluorine laser beam having a predetermined wavelength. The gap spacing reduces gradually over the curved surface 24 until the gap spacing becomes d+$\lambda$/4 between the reflecting surface 22 and the outer reflecting surfaces 26.

Alternative arrangements may include optical block 18 having the $\lambda$/4 curved, raised portion and optical block 20 having a planar reflecting surface, or each of optical blocks 18 and 20 having opposed $\lambda$/8 curved, raised portions. Other such alternative arrangements would be understood by those skilled in the art whereby the optical path difference between the reflectivity maximum portions at the peaks of the curved, raised portions and the reflectivity zero or suppressed portion or portions is $\lambda$/4.

FIG. 5b shows an alternative interferometer for use as an output coupling reflector for an excimer or molecular fluorine laser to that shown and described with respect to FIG. 5a. The interferometer of FIG. 5b includes a pair of optical blocks 28 and 30. Reflecting surface 32 of optical block 28 opposes a central reflecting curved, recess surface 34 of optical block 30. The curved, recessed surface 34 is preferably symmetrical about its center and is further preferably Gaussian-shaped. The gap spacing increases along curved recessed portion 34 until reflecting surface 32 of optical block 28 also opposes reflecting side surfaces 36 of optical block 30. The gap spacing d between central reflecting recess surface 34 and the reflecting surface 32 is set for maximum reflectivity at its maximum depth preferably at its center of an the excimer or molecular fluorine laser beam having a predetermined wavelength. The gap spacing gradually reduces along the recess surface 34 until the gap spacing becomes d–$\lambda$/4 between the reflecting surface 32 and the outer reflecting surfaces 36.

Again, alternative arrangements may include optical block 28 having the $\lambda$/4 curved, recess portion and optical block 30 having a planar reflecting surface, or each of optical blocks 28 and 30 having a recess with maximum depth being $\lambda$/8. Other such alternative arrangements are possible whereby the optical path difference between the reflectivity maximum portions and the reflectivity zero or suppressed portion or portions is $\lambda$/4 preferably at the point of maximum depth or depths of the recess or recesses.

Thus, preferred embodiment B is characterized in that the optical path length near the beam center differs by that at the outer regions by ±$\lambda$/4. The path difference gradually makes this transition between the center and outer regions of the interferometer. The output coupling interferometer of preferred embodiment B exemplified at FIGS. 5a–5b preferably includes external surfaces of blocks 18, 20, 28 and 30 with antireflection (AR) coatings. As mentioned, many modifications within the scope of preferred embodiment B are conceivable (e.g., two inner surfaces having equal phase jumps of $\pi$/4 at their maximum or minimum gap spacing, or otherwise adding up to phase jumps of $\pi$/2 at their maximum or minimum gap spacing from the outer regions).

Figure 5C:
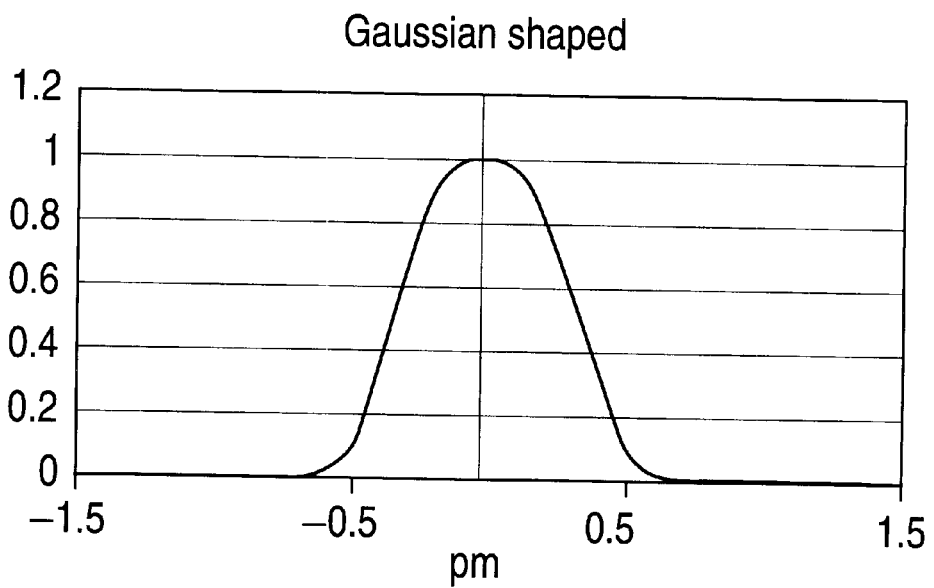

The calculated spectrum of a narrow band KrF-laser using an output coupling interferometer according to preferred embodiment B is shown at FIG. 5c. The calculations provide a rough picture of the spectrum of the output beam that could be expected. The calculations follow those provided above for preferred embodiment A, but are modified according to the curvature of the raised or recess curved portions of the interferometer blocks. Advantageously, sidebands are suppressed as the gap spacing changes from the peak at R=maximum out to the boundaries between the central surface 24 or 34 of FIGS. 5a and 5b and the side surfaces 26 and 36, respectively, thereby reducing the spectral purity of the beam in accordance with the object of the invention.

Preferred embodiment C

Figure 6A:
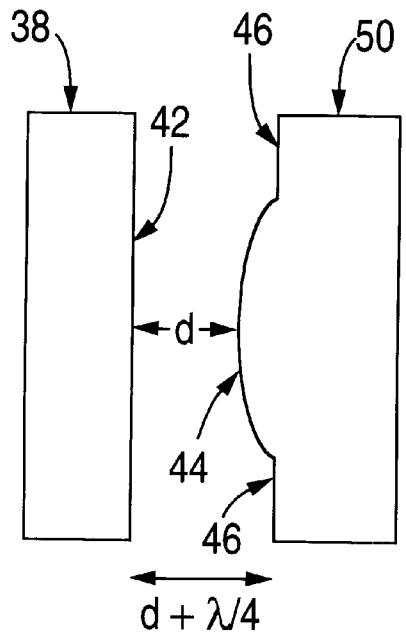
FIG. 6a schematically shows a fifth output coupling interferometer in accord with a fifth embodiment.
Figure 6B:
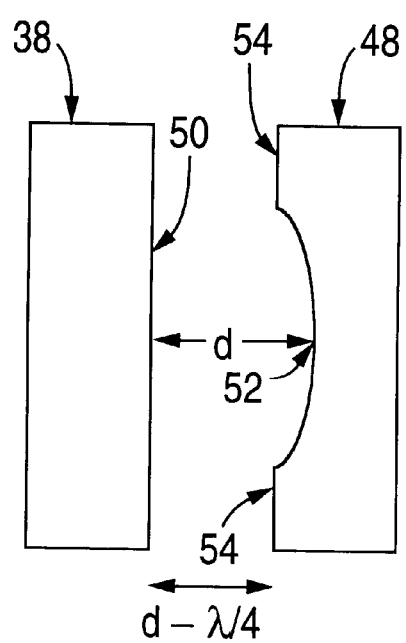
FIG. 6b schematically shows a sixth output coupling interferometer in accord with a sixth embodiment.

The preferred embodiment C is depicted at FIGS. 6a and 6b. FIG. 6a shows an interferometer for use as an output coupling reflector for an excimer or molecular fluorine laser. The interferometer includes a pair of optical blocks 38 and 40. Reflecting surface 42 of optical block 38 opposes a curved, raised central reflecting surface 44 of optical block 40. The curved, raised surface 44 is preferably symmetrical about its center and further is preferably cylindrically shaped. Reflecting surface 42 of optical block 38 also opposes reflecting side surfaces 46 of optical block 40. The gap spacing d between the center, or peak, of curved, raised cylindrical reflecting surface 44 and the reflecting surface 42 is preferably set for maximum reflectivity of an the excimer or molecular fluorine laser beam having a predetermined wavelength. The gap spacing reduces gradually away from the center of the cylindrically-curved surface 44 until the gap spacing becomes d+$\lambda$/4 between the reflecting surface 42 and the outer reflecting surfaces 46, where the reflectivity of the interferometer is substantially zero.

Alternative arrangements may include optical block 38 having the $\lambda$/4 curved, raised cylindrical central portion and optical block 40 having a planar reflecting surface, or each of optical blocks 38 and 40 having opposed $\lambda$/8 curved, raised and opposed cylindrical portions. Other such alternative arrangements would be understood by those skilled in the art whereby the optical path difference between the reflectivity maximum portions at the peaks of the curved, raised portions and the reflectivity zero or suppressed portion or portions is $\lambda$/4.

FIG. 6b shows an alternative interferometer for use as an output coupling reflector for an excimer or molecular fluorine laser to that shown and described with respect to FIG. 6a. The interferometer of FIG. 6b includes a pair of optical blocks 38 and 48. Reflecting surface 50 of optical block 38 opposes a central reflecting curved, recessed surface 52 of optical block 48. The curved, recessed surface is preferably symmetrical about its center and further is preferably cylindrically-shaped. The gap spacing decreases away from center along cylindrically-curved recessed portion 52 until reflecting surface 50 of optical block 38 also opposes reflecting side surfaces 54 of optical block 48. The gap spacing d between central reflecting recess surface 52 and the reflecting surface 50 is set for maximum reflectivity at its maximum depth preferably at its center of an the excimer or molecular fluorine laser beam having a predetermined wavelength. The gap spacing gradually reduces along the cylindrical recess surface 52 until the gap spacing becomes d−λ/4 between the reflecting surface 50 and the outer reflecting surfaces 54.

Again, alternative arrangements may include optical block 38 having the λ/4 curved, recessed portion and optical block 48 having a planar reflecting surface, or each of optical blocks 38 and 48 having a recess with maximum depth being λ/8. Other such alternative arrangements would be understood by those skilled in the art whereby the optical path difference between the reflectivity maximum portions and the reflectivity zero or suppressed portion or portions is λ/4 preferably at the point of maximum depth or depths of the recess or recesses.

Thus, preferred embodiment C is characterized in that the optical path length near the beam center differs by that at the outer regions by ±λ/4. The path difference gradually makes this transition along a cylindrical raised or recessed surface of at least one of two optical blocks between the center and outer regions of the interferometer. The output coupling interferometer of preferred embodiment C exemplified at FIGS. 6a–6b preferably includes external surfaces of blocks 38, 40 and 48 with antireflection (AR) coatings. As mentioned, many modifications within the scope of preferred embodiment C are conceivable (e.g., two inner surfaces having equal phase jumps of π/4 at their maximum or minimum gap spacing, or otherwise adding up to phase jumps of π/2 at their maximum or minimum gap spacings preferably at their center from outer regions).

Figure 6C:
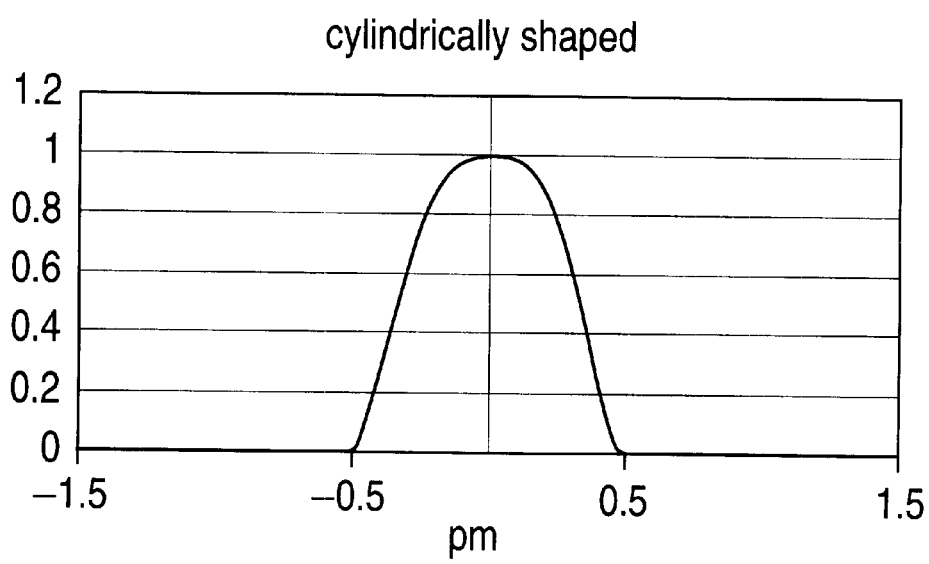

The calculated spectrum of a narrow band KrF-laser using an output coupling interferometer according to preferred embodiment C is shown at FIG. 6c. The calculations provide a rough picture of the spectrum of the output beam that could be expected. The calculations follow those provided above for preferred embodiment A, but are modified according to the cylindrical curvature of the raised or recess curved portions of the interferometer blocks. Advantageously, sidebands are suppressed as the gap spacing changes from the peak at R=maximum out to the boundaries between the central surface 44 or 52 of FIGS. 6a and 6b and the side surfaces 46 and 54, respectively, thereby reducing the spectral purity of the beam in accordance with the object of the invention.

Embodiment C is similar to embodiment B, but is easier for preparation. The inner surfaces are preferably uncoated and the outer surfaces are preferably antireflection (AR)-coated. At least one inner surface is cylindrically curved along the x-axis. The radius of curvature is preferably selected to coincide with the diameter of the beam profile, just as the central raised or recessed portions of any of the preferred embodiments is selected to extend just to suppress the tails of the spectral distribution of the beam without suppressing too much of the main portion of the beam which would result in greatly reduced gain. The radius of curvature r can be determined by the following estimation:

$$d(x)=d(0)+\lambda/4 \qquad \text{(equation 5)}$$

where x is nearly given (equation 1) by x≈0.7 FSR/(dλ/dx). With FSR=1.6 pm and (dλ/dx)=1.24 pm/mm we get x≈1 mm. Based on equation 5, the radius of curvature r is given by $$r=2x^2/\lambda \qquad \text{(equation 6)}$$

With λ=248 nm we get a preferred radius of curvature of r=8 m.

It is understood by those skilled in the art that the preferred Gaussian and cylindrical shapes described above with respect to embodiments B and C, and the step or recess of embodiment A are illustrative shapes. For example, any of a wide variety of curvatures may be used that are preferably symmetrical about their center and have a reflectivity maximum at that center portion and then curve to effect a change in the reflectivity to suppress side bands. The shape may be a series of two or more connected straight portions or a combination of one or more straight portions and one or more curved portions. For example, the center portion may be triangularly or trapezoidally-shaped, or may have a central curved portion that connects with the outer R=0 portions via straight connectors.

In further aspects of the invention, a narrow band excimer laser containing an output coupling interferometer and grating-based-narrowing optics located at the rear of the laser are synchronized to maximize performance. The preferred embodiments below relate to synchronization procedures of the narrow band unit and the outcoupling etalon.

Figure 7:
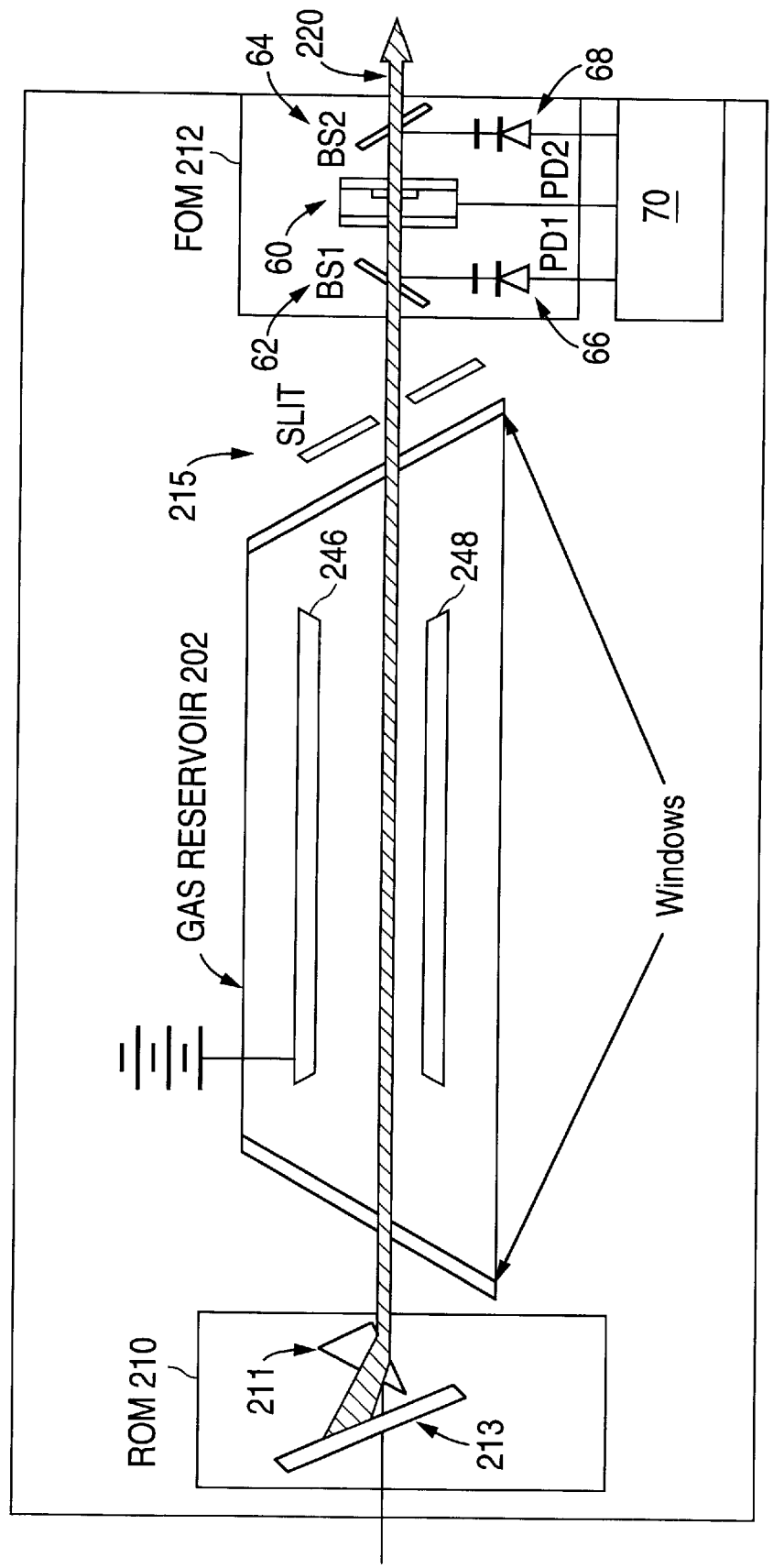
FIG. 7 schematically shows an excimer or molecular fluorine laser resonator including an output coupling interferometer in accord with any of the first through sixth embodiments, and further including a control unit for tuning the interferometer.

FIG. 7 schematically shows an excimer or molecular fluorine laser resonator including an output coupling interferometer in accord with any of the first through sixth embodiments. In addition, the synchronization procedures described herein may be applied with systems including conventional etalon output couplers such as has been described above and/or that may be described in the references cited above and incorporated by reference into this application.

The resonator shown in FIG. 7 includes a gas reservoir or discharge chamber 202 and a pair of main discharge electrodes 246, 248 for energizing the gases in the discharge chamber 202 by electrical discharge excitation. The chamber 202 has a windows 203 on either end and sits between a rear optics module 210 and a front optics module 212. The rear optics module 210 shown includes a beam expander 211 and a retro-reflection grating 213. A slit 215 is shown disposed between the chamber 202 and the front optics module 212.

The front optics module 212 includes an output coupling interferometer 60. The interferometer 60 has a first beam splitter 62 and a second beam splitter 64 in front of and behind it along the optical path of the output beam 220. As will be seen in the preferred embodiments that follow, one or both of the first and second beam splitters 62 and 64, respectively, may be used. The first beam splitter 62 shown in FIG. 7 is for reflecting a portion of the beam reflected by the interferometer 60 to a first photodiode 66. The second beam splitter 64 shown in FIG. 7 is for reflecting a portion of the beam transmitted by the interferometer 60 to a second photodiode 68. An interferometer control unit 70 is shown in FIG. 7 for receiving signals from the first and second photodiodes 66 and 68, respectively, and for controlling the tuning of the interferometer 60. Further details of the preferred excimer or molecular fluorine laser resonator, and the preferred overall laser system, are provided below with reference to FIG. 12.

The output coupling interferometer 60 located inside of the front optics module 212 of FIG. 7 is adjusted as controlled by the control unit 70 to reflect radiation at or very near a spectral maximum produced by the echelle grating 213. This grating 213 is located inside the narrow band unit of the rear optics module 210 of FIG. 7. Synchronization in this sense means the interferometer 60 has its maximum of reflection at the maximum of the spectral distribution of the intracavity laser radiation produced by the narrow band optics of the rear optics module 210. Several preferred embodiments are disclosed for tuning the interferometer 60 to match the "maximum" wavelength selected by the rear optics module 210.

There are generally three synchronization techniques that are particularly preferred:

1) A first preferred technique includes tuning of the outcoupling interferometer 60 to get maximum intracavity power reflection. This entails a minimum degree of outcoupling and minimized intracavity losses.
2) A second preferred technique includes tuning of the outcoupling interferometer 60 to get maximum intensity of interference fringes behind a monitor etalon disposed where the second photodiode 68 is shown in FIG. 7.
3) A third preferred technique includes tuning of the outcoupling interferometer 60 and detection of the reflected (or transmitted) light by a position—sensitive detector (e.g., double- or quadrant photodiode) disposed where either of the first or second photodiodes 66 or 68, respectively, are shown in FIG. 7.

Preferred Embodiment A

Figure 8A:
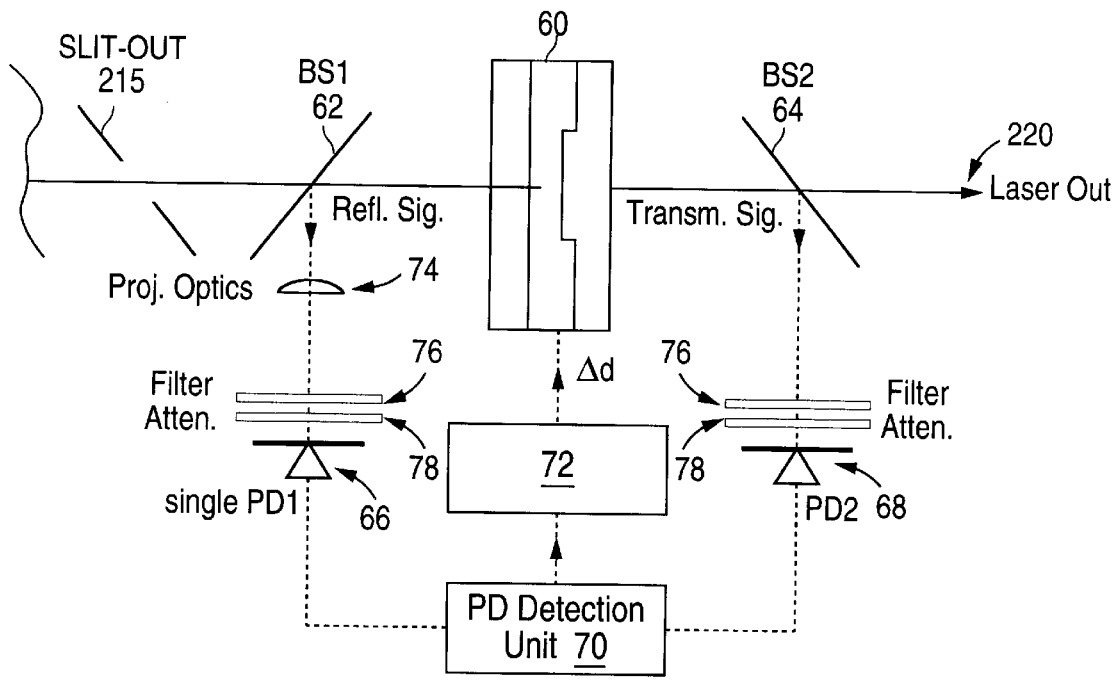
FIG. 8a schematically shows a first preferred embodiment of the control unit of FIG. 7.
Figure 8B:
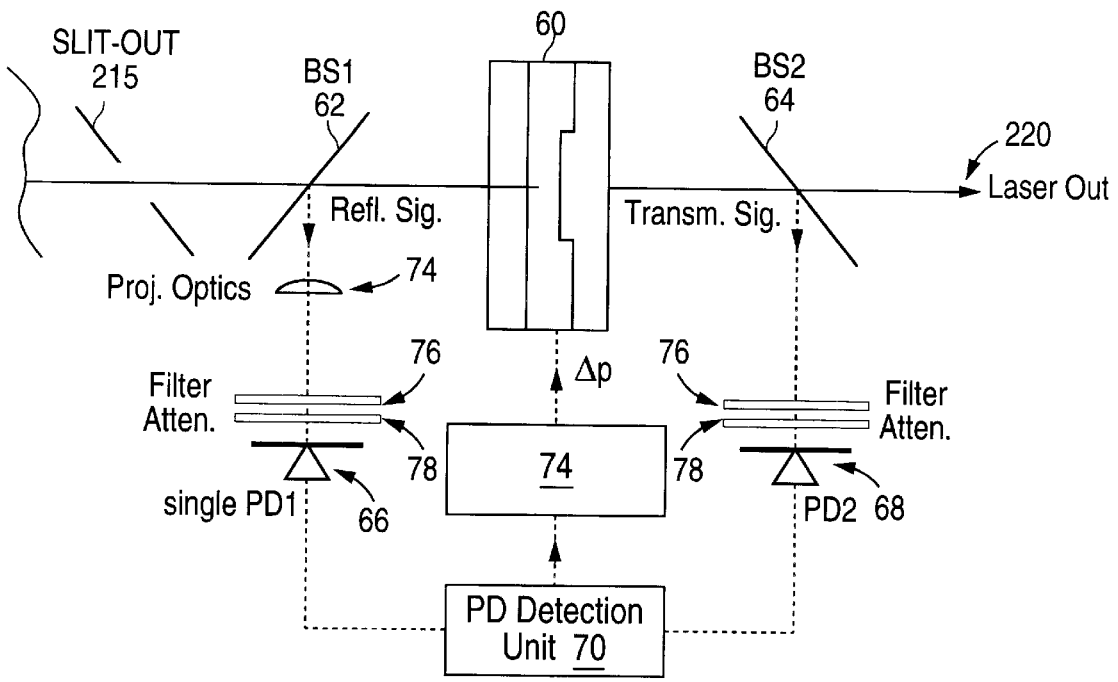
FIG. 8b schematically shows a second preferred embodiment of the control unit of FIG. 7.

A first preferred embodiment of the front optics module 212 for realizing the first preferred synchronization technique is schematically depicted at FIGS. 8a and 8b. Referring to FIG. 8a, the front optics module 212 receives a beam via the slit 215 from the discharge chamber 202 (not shown) and rear optics module 210 (not shown). The beam is partially reflected and partially transmitted at the output coupling interferometer 60, which is illustratively shown as having the optics blocks 2 and 4 of FIG. 4a.

The reflected beam is partially reflected at beam splitter 62. The remainder of the beam reflected by the interferometer 60 re-enters the discharge chamber 202 (not shown) en route to the rear optics module 210 (not shown). The beam portion reflected at the beam splitter 62 preferably passes through each of projection optics 74, a filter 76 and an attenuator 78 before being detected at the first photodiode 66.

The transmitted beam is partially reflected at beam splitter 64. The remainder of the beam transmitted by the interferometer 60 passes out of the resonator as the output laser beam 220 of the excimer or molecular fluorine laser system, preferably en route to an applications process such as to an imaging system for photolithography or for TFT annealing or micro-machining or other industrial process. The beam portion reflected at the beam splitter 64 preferably passes through a filter 76 and attenuator 78 before being detected at the second photodiode 68.

The control unit 70, also referred to as a photodiode detection unit, receives signals from each of the first and second photodiodes 66 and 68, respectively. The control unit 70 signals a piezo control unit 72 for tuning the interferometer 60 based on the signals received from the first and second photodiodes 66 and 68, respectively. The embodiment shown at FIG. 8b is the same as that shown at FIG. 8a except that a pressure control unit 74 is used for tuning the interferometer 60.

With respect to the preferred embodiment A of the front optics module 212, the beamsplitter 62 reflects a portion of the radiation reflected at the output coupling interferometer 60 to the first photodiode 66. The first photodiode 66 detects the reflected power. The second photodiode 68 is used for detection of the outcoming pulse energy, which is maintained nearly constant when the laser is operated in an energy stabilized mode. The slit 215, having its slit edges preferably adjusted parallel to the long axis of the beam profile, is disposed in the optical pathway between the discharge chamber 202 and the beamsplitter 62. The slit 215 advantageously serves to reduce the side modes before the beam encounter the interferometer 60. As discussed, a main difference between the embodiments shown in FIGS. 8a and 8b is that the free spectral range of the interferometer 60 of FIG. 8a is piezo-controlled and the free spectral range of the interferometer 60 of FIG. 8b is pressure-controlled. Any of the embodiments of this invention may use piezo or pressure-controlled tuning of the interferometer 60 (see also FIGS. 9a–9b, 10a–10b and 11, e.g.).

Preferred Embodiment B

Figure 9A:
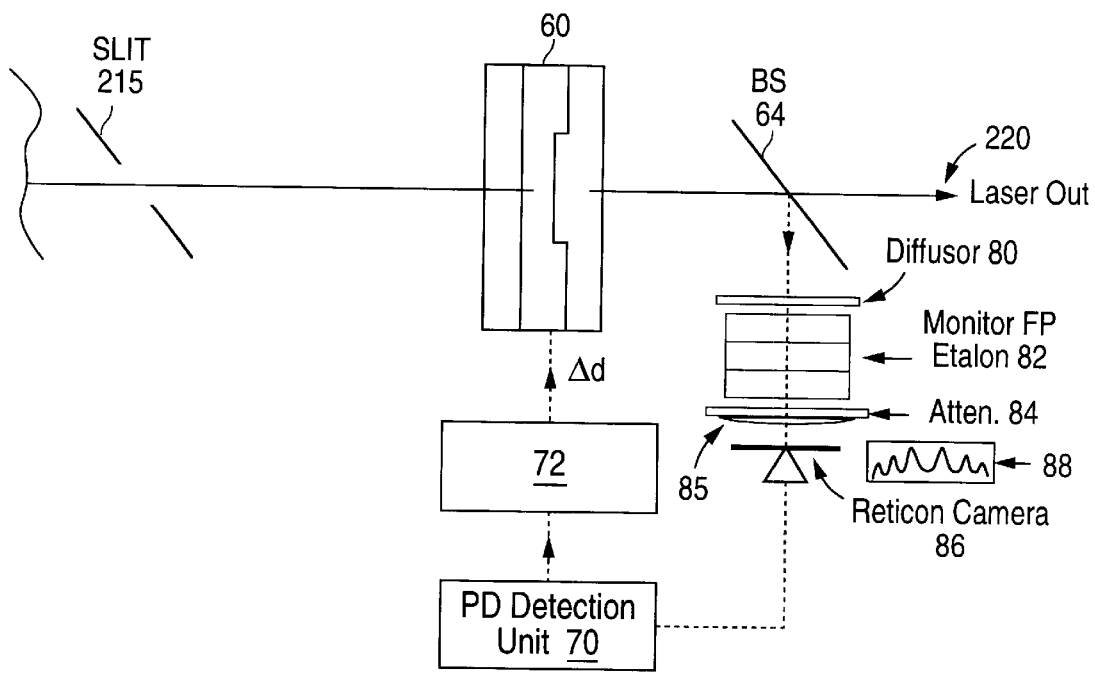
FIG. 9a schematically shows a third preferred embodiment of the control unit of FIG. 7.
Figure 9B:
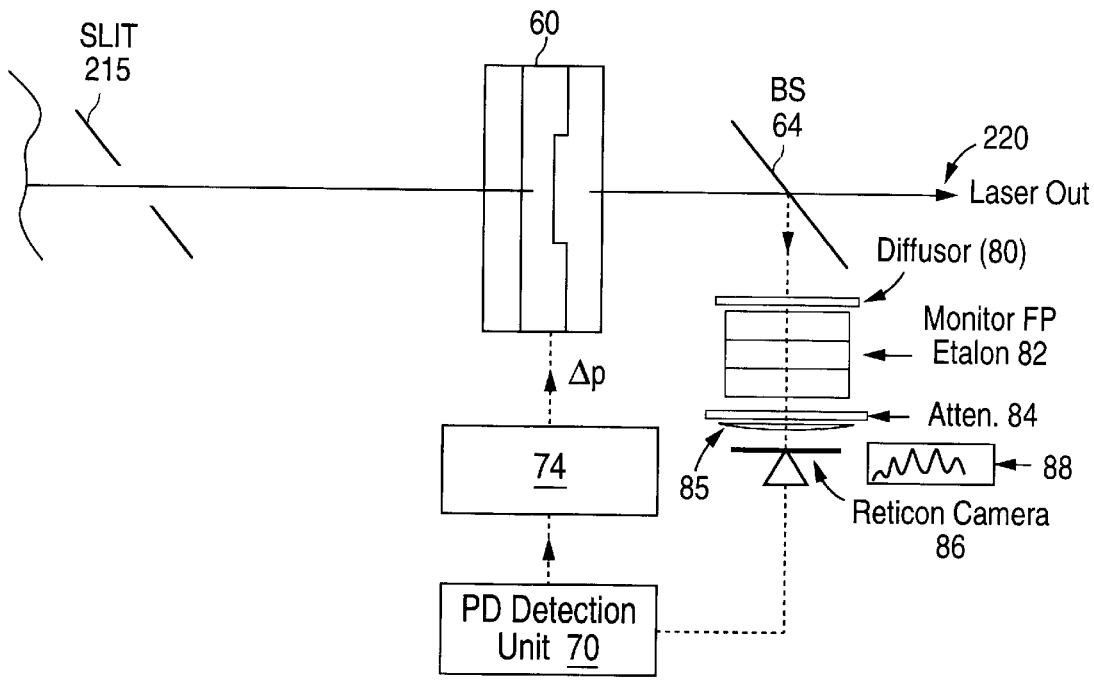
FIG. 9b schematically shows a fourth preferred embodiment of the control unit of FIG. 7.

A second preferred embodiment of the front optics module 212 for realizing the second preferred synchronization technique is schematically depicted at FIGS. 9a and 9b. The second preferred embodiment includes the interferometer 60, beam splitter 64, control unit 70 and either the piezo or pressure tuning unit 72 or 74 as shown in FIGS. 9a and 9b, respectively, each being preferably the same as already described above with respect to the first embodiment of FIGS. 8a and 8b, respectively. In this second embodiment, the beam portion reflected at the beam splitter 64 preferably passes through a diffusor before encountering a monitor Fabry-Perot etalon 82. An attenuator 84 and imaging optics 85 are disposed after the monitor etalon 82. An array detector or camera 86 is disposed after the monitor etalon 82 to capture images 88 of its transmitted fringe spectrum. The control unit 70 receives a signal from the camera 86 used for tuning the interferometer 60.

With respect to the embodiments of FIGS. 9a and 9b, a portion of the radiation transmitted by the interferometer 60 is reflected by beamsplitter 64 to the system including the monitor etalon 82 which preferably includes the Fabry Perot etalon 82, the diffusor 80, imaging optics 85 and, e.g., a CCD-camera 86 or photodiode array or other position sensitive image detector. The CCD-camera 86 detects the interference fringes 88 behind the Fabry Perot etalon 82. The outcoupling interferometer 60 is tuned to get maximum intensity of the fringes.

Preferred Embodiment C

Figure 10A:
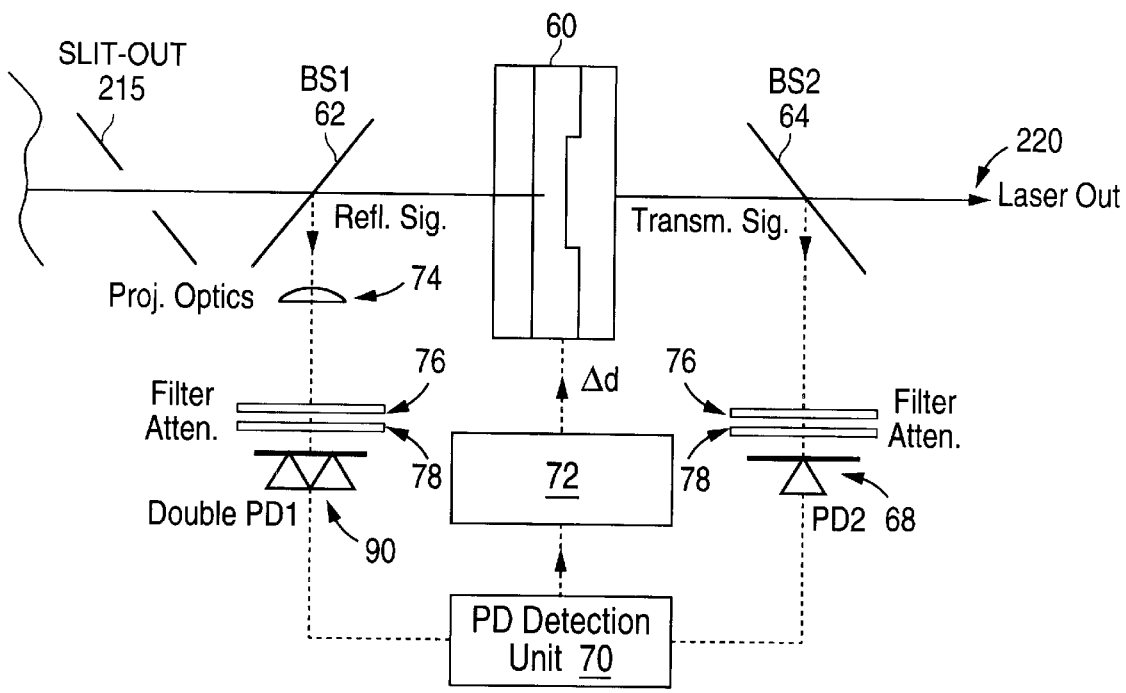
FIG. 10a schematically shows a fifth preferred embodiment of the control unit of FIG. 7.
Figure 10B:
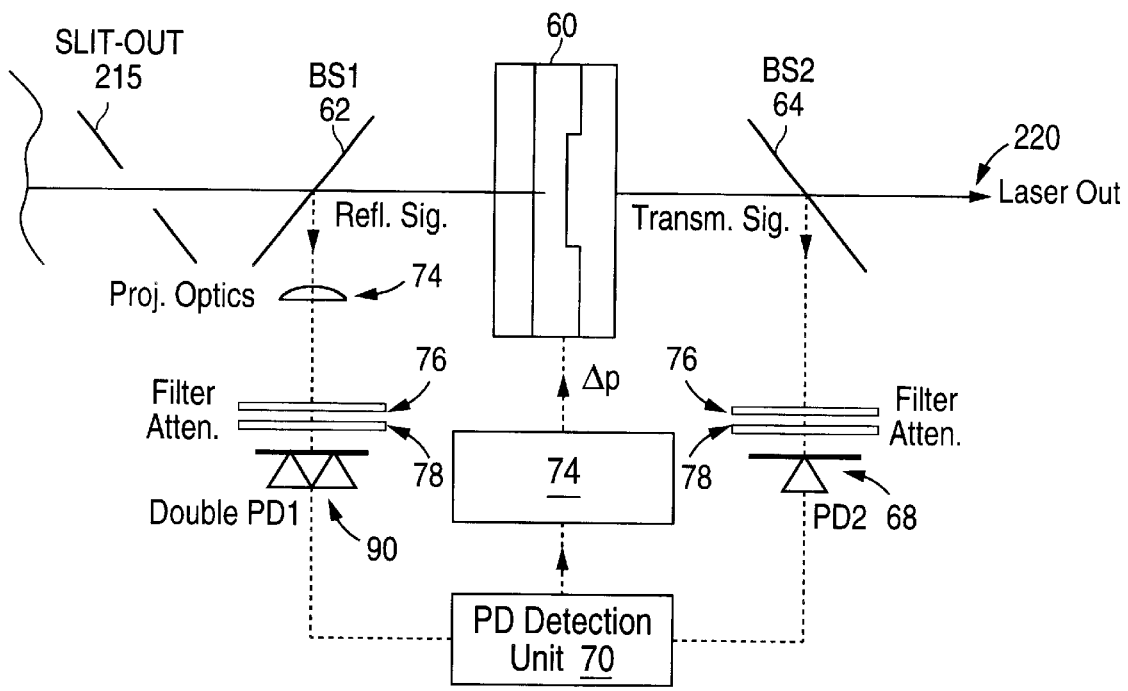
FIG. 10b schematically shows a sixth preferred embodiment of the control unit of FIG. 7.

A third preferred embodiment of the front optics module 212 for realizing the third preferred synchronization technique is schematically depicted at FIGS. 10a and 10b. The optical system is similar to that of preferred embodiment A referring to FIGS. 8a and 8b (see above), and those description of same elements will not be repeated here. The first photodiode 66 of FIGS. 8a and 8b is exchanged by a position-sensitive detector 90 (e.g., a double-or quadrant photodiode). An advantage of preferred embodiment C in comparison to preferred embodiments A and B is that the double- or quadrant photodiode 90 delivers additional information about the direction of the detuning of the interferometer 60.

Figure 11:
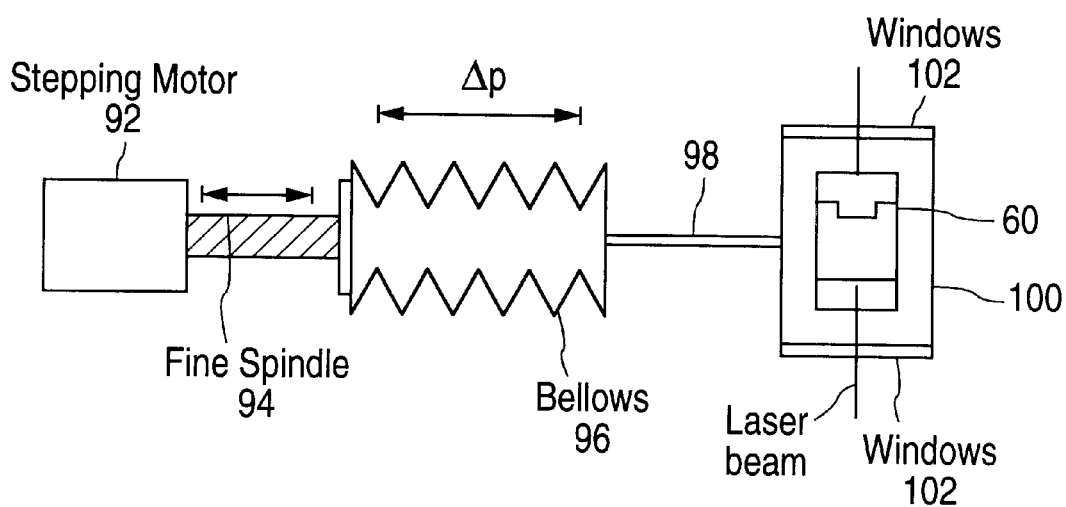
FIG. 11 shows a pressure control unit for a pressure tuned output coupling interferometer in accord with a preferred embodiment.
Figure 3A:
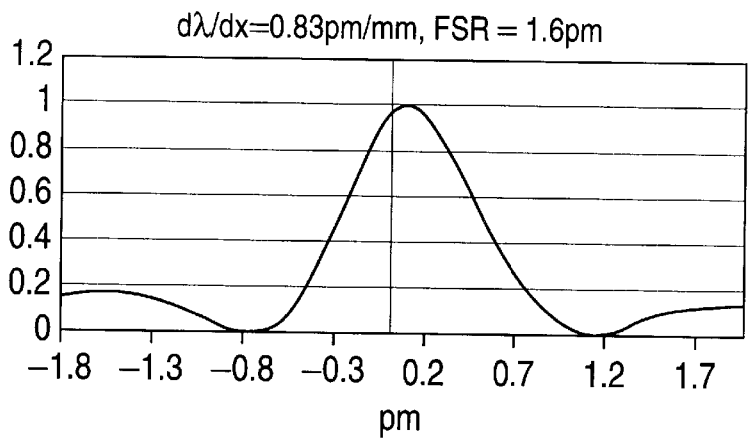
FIG. 3a shows a first calculated spectrum of an output beam of a conventional KrF excimer laser having a grating and an etalon output coupler.
Figure 3B:
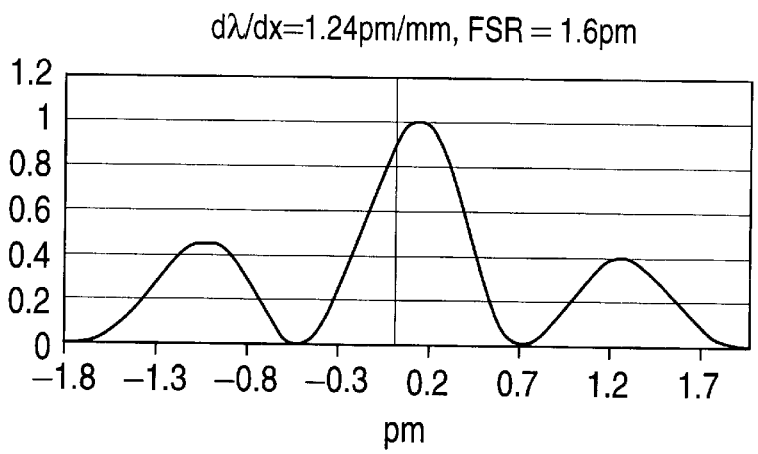
FIG. 3b shows a second calculated spectrum of an output beam of a conventional KrF excimer laser similarly configured as that for calculating the spectrum of FIG. 3a, except that it has a grating with higher spatial dispersion.
Figure 3C:
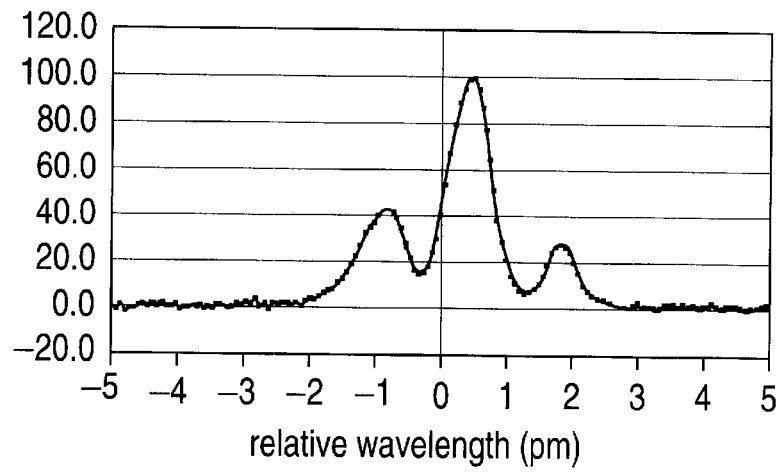
FIG. 3c shows a measured spectrum of an output beam of a conventional KrF excimer laser having the grating of FIG. 3b.

FIG. 11 schematically shows a preferred embodiment for a pressure tuning unit 74 for pressure tuning the output coupling interferometer 60, for use with any of the embodiments shown in FIGS. 8b, 9b or 10b. The preferred pressure tuning assembly includes a stepping motor 92, a fine spindle 94, a bellows 96 and a gas connector 98 to an interferometer housing 100 having windows for transmitting the laser beam. The stepper motor 92 or any other motor drives an inert gas filled bellow 96, wherein the gas is preferably nitrogen or alternatively a noble gas such as argon or helium. The bellow 96 is fluidly connected with the sealed-off housing 100 containing the interferometer 60. As the volume in the bellows 96 is adjusted, the pressure in the bellows 96 and in the housing 100, and particularly in the gap between the optics blocks of the interferometer 60, changes accordingly.

The object of the invention set forth above are thus met. The details of the front optics module 212 and particularly relating to the output coupling interferometer 60 of the preferred embodiments may be advantageously used to achieve an excimer or molecular fluorine laser having improved spectral purity by suppressing side bands of the laser beam for such industrial applications as microlithography, TFT annealing and micromachining, among others.

Figure 12:
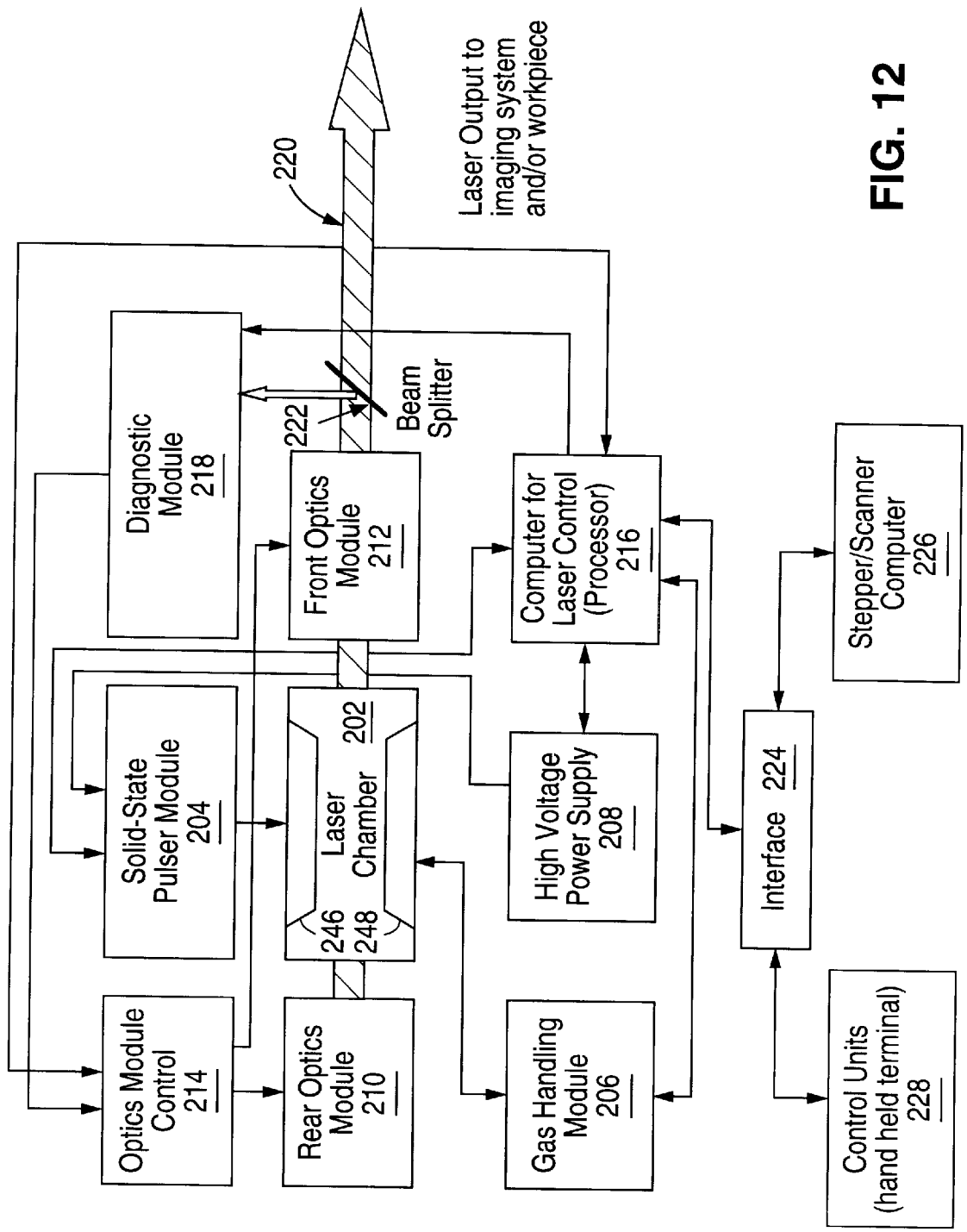
FIG. 12 shows an excimer or molecular fluorine laser system in accord with a preferred embodiment.

Referring now to FIG. 12, the preferred excimer or molecular fluorine laser system will not be described. A gas discharge laser system, preferably a DUV or VUV laser system, such as an excimer, e.g., ArF or KrF, or molecular fluorine (F2) laser system for deep ultraviolet (DUV) or vacuum ultraviolet (VUV) lithography, is schematically shown at FIG. 12. Alternative configurations for laser systems for use in such other industrial applications as TFT annealing and/or micromachining, e.g., are understood by one skilled in the art as being similar to and/or modified from the system shown in FIG. 12 to meet the requirements of that application. For this purpose, alternative DUV or VUV laser system and component configurations are described at U.S. patent application Ser. Nos. 09/317,695, 09/317,526, 09/130,277, 09/244,554, 09/452,353, 09/317,527, 09/343,333, 60/122,145, 60/140,531, 60/162,735, 60/166,952, 60/171,172, 60/141,678, 60/173,993, 60/166,967, 60/147,219, 60/170,342, 60/162,735, 60/178,445, 60/166,277, 60/167,835, 60/171,919, 60/202,564, 60/204,095, 60/172,674, 09/574,921 and 60/181,156, and U.S. Pat. Nos. 6,005,880, 6,061,382, 6,020,723, 5,946,337, 6,014,206, 5,559,816, 4,611,270, 5,761,236, each of which is assigned to the same assignee as the present application, and those references set forth above, are hereby incorporated by reference.

The system shown in FIG. 12 generally includes a laser chamber 202 having a pair of main discharge electrodes 46, 48, e.g., as described above with respect to FIG. 7, connected with a solid-state pulser module 204, and a gas handling module 206. The solid-state pulser module 204 is powered by a high voltage power supply 208. The laser chamber 202 is surrounded by optics module 210 and optics module 212, forming a resonator. The optics module 210 is preferably controlled by an optics control module 214, or may be alternatively directly controlled by a computer 216, and the front optics module 212 is preferable controlled by the control unit 70 described above, which may be a part of or separate from the module 214.

The computer 216 for laser control receives various inputs and controls various operating parameters of the system. A diagnostic module 218 receives and measures one or more parameters of a split off portion of the main beam 220 via optics for deflecting a small portion of the beam toward the module 218, such as preferably a beam splitter module 222, as shown. The beam 220 is preferably the laser output to an imaging system (not shown) and ultimately to a workpiece (also not shown), and may be output directly to an application process. The laser control computer 216 communicates through an interface 224 with a stepper/scanner computer 226 and other control units 228.

Laser Chamber

The laser chamber 202 contains a laser gas mixture and includes one or more preionization electrodes (not shown here, but described above with respect to FIGS. 2–6) in addition to the pair of main discharge electrodes 46, 48. Preferred main electrodes 46 and 48 are described at U.S. patent application Ser. Nos. 09/453,670, 60/184,705 and 60/128,227, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are described at United States patent application of Bragin et al, serial number not yet assigned, entitled Corona Preionization Assembly for a Gas Laser, filed Oct. 19, 2000, and details and alternative configurations are additionally set forth at U.S. patent application Ser. Nos. 60,162,845, 60/160,182, 60/127,237, 09/535,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

Power Supply Circuit and Pulser Module

The solid-state pulser module 204 and high voltage power supply 208 supply electrical energy in compressed electrical pulses to the preionization and main electrodes 46, 48 within the laser chamber 202 to energize the gas mixture. Components of the preferred pulser module and high voltage power supply may be described at U.S. patent application Ser. Nos. 60/149,392, 60/198,058, 60/204,095, 09/432,348 and 09/390,146, and 60/204,095, and U.S. Pat. Nos. 6,005,880 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of one Joule of electrical power (see the '988 patent, mentioned above).

Laser Resonator

The laser resonator which surrounds the laser chamber 202 containing the laser gas mixture includes optics module 210 including line-narrowing optics for a line narrowed excimer or molecular fluorine laser, which may be replaced by a high reflectivity mirror or the like in a laser system wherein either line-narrowing is not desired, or if line narrowing is performed at the front optics module 212, or a spectral filter external to the resonator is used, or if the line-narrowing optics are disposed in front of the HR mirror, for narrowing the linewidth of the output beam.

The laser chamber 202 is sealed by windows transparent to the wavelengths of the emitted laser radiation 220. The windows may be Brewster windows or may be aligned at another angle, e.g., 5°, to the optical path of the resonating beam. One of the windows may include the interferometer 60 described above which also serves to output couple the beam.

Extra-Resonator Features

After a portion of the output beam 220 passes the outcoupler of the optics module 212, that output portion impinges upon beam splitter module 222 which includes optics for deflecting a portion of the beam to the diagnostic module 218, or otherwise allowing a small portion of the outcoupled beam to reach the diagnostic module 218, while a main beam portion 220 is allowed to continue as the output beam 220 of the laser system. the diagnostic module may include the photodiode 68 and/or monitor etalon 82, described above. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 218. A holographic beam sampler, transmission grating, partially transmissive reflection diffraction grating, grism, prism or other refractive, dispersive and/or transmissive optic or optics may also be used to separate a small beam portion from the main beam 220 for detection at the diagnostic module 218, while allowing most of the main beam 220 to reach an application process directly or via an imaging system or otherwise.

The output beam 220 may be transmitted at the beam splitter module 222 while a reflected beam portion is directed at the diagnostic module 218, or the main beam 220 may be reflected, while a small portion is transmitted to the diagnostic module 218. The portion of the outcoupled beam which continues past the beam splitter module 222 is the output beam 220 of the laser, which propagates toward an industrial or experimental application such as an imaging system and workpiece for photolithographic applications. Variations of beam splitter modules 222 particularly for a molecular fluorine laser system are set forth at U.S. patent application Ser. Nos. 09/598,552 and 60/140,530, which are each assigned to the same assignee as the present application and are hereby incorporated by reference.

Beam Path Enclosure

Also particularly for the molecular fluorine laser system, and for the ArF laser system, an enclosure (not shown) may seal the beam path of the beam 220 such as to keep the beam path free of photoabsorbing species. Smaller enclosures may seal the beam path between the chamber 202 and the optics modules 210 and 212 and between the beam splitter module 222, which itself may be within the same or a separate enclosure, and the diagnostic module 218. The preferred enclosure is described in detail in U.S. patent application Ser. Nos. 09/343,333, 09/598,552, 09/594,892, 09/131,580 and 60/140,530, each of which is assigned to the same assignee and is hereby incorporated by reference, and U.S. Pat. Nos. 5,559,584, 5,221,823, 5,763,855, 5,811,753 and 4,616,908, all of which are hereby incorporated by reference.

Diagnostic Module

The diagnostic module 218 preferably includes at least one energy detector. This detector measures the total energy of the beam portion that corresponds directly to the energy of the output beam 220 (see U.S. Pat. No. 4,611,270 and U.S. patent application Ser. No. 09/379,034, each of which is assigned to the same assignee and is hereby incorporated by reference). An optical configuration such as an optical attenuator, e.g., a plate or a coating, or other optics may be formed on or near the detector or beam splitter module 222 to control the intensity, spectral distribution and/or other parameters of the radiation impinging upon the detector (see U.S. patent application Ser. Nos. 09/172,805, 60/172,749, 60/166,952 and 60/178,620, each of which is assigned to the same assignee as the present application and is hereby incorporated by reference).

One other component of the diagnostic module 218 is preferably a wavelength and/or bandwidth detection component such as a monitor etalon or grating spectrometer (see U.S. patent application Ser. Nos. 09/416,344, 60/186,003, 60/158,808, 60/186,096, 60/186,096 and 60/186,096 and 60/202,564, each of which is assigned to the same assignee as the present application, and U.S. Pat. Nos. 4,905,243, 5,978,391, 5,450,207, 4,926,428, 5,748,346, 5,025,445, and 5,978,394, all of the above wavelength and/or bandwidth detection and monitoring components being hereby incorporated by reference. This monitor etalon can be the same one described above with respect to FIGS. 9a and 9b, or a second monitor etalon. The spectrometer may be within a temperature and pressure controlled housing such as is described in the No. 60/158,808 application.

Other components of the diagnostic module may include a pulse shape detector or ASE detector, such as are described at U.S. patent application Ser. Nos. 09/484,818 and 09/418,052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206 which is assigned to the same assignee and is hereby incorporated by reference.

Control Processor

The processor or control computer 216 receives and processes values of some of the pulse shape, energy, ASE, energy stability, energy overshoot for burst mode operation, wavelength, spectral purity and/or bandwidth, among other input or output parameters of the laser system and output beam. The processor 216 also controls the line narrowing module to tune the wavelength and/or bandwidth or spectral purity, and controls the power supply and pulser module 204 and 208 to control preferably the moving average pulse power or energy, such that the energy dose at points on the workpiece is stabilized around a desired value. In addition, the computer 216 controls the gas handling module 206 which includes gas supply valves connected to various gas sources.

Further details of the control processor 216 such as for performing burst overshoot control and controlling the gas supply unit by monitoring total input energy to the discharge, among other parameters, for determining the timing and amounts of gas replenishment actions, are described at U.S. patent application Ser. No. 60/159,525, which is assigned to the same assignee as the present application and is hereby incorporated by reference.

Gas Mixture

The laser gas mixture is initially filled into the laser chamber 202 during new fills. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405 and 4,977,573 and U.S. patent application Ser. Nos. 09/317,526, 09/513,025, 60/124,785, 09/418,052, 60/159,525 and 60/160,126, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas, such as xenon, may be added for increased energy stability and/or as an attenuator as described in the Ser. No. 09/513,025 application incorporated by reference above. Specifically, for the $F_2$-laser, an addition of xenon and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

Gas Replenishment, General

Halogen and rare gas injections, total pressure adjustments and gas replacement procedures are performed using the gas handling module 206 preferably including a vacuum pump, a valve network and one or more gas compartments. The gas handling module 206 receives gas via gas lines connected to gas containers, tanks, canisters and/or bottles. Some preferred and alternative gas handling and/or replenishment procedures are described at U.S. Pat. Nos. 4,977, 573 and 5,396,514 and U.S. patent application Ser. Nos. 60/124,785, 09/418,052, 09/379,034, 60/159,525, 60/171, 717, and 60/159,525, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Line-Narrowing

A general description of the line-narrowing features of the preferred embodiment is provided here, followed by a listing of patent and patent applications being incorporated by reference as describing variations and features that may used with the preferred embodiments described above for providing an output beam with a high spectral purity or bandwidth (e.g., below 0.6 pm). Exemplary line-narrowing optics contained in the optics module 210 include a beam expander, an optional etalon and a diffraction grating, which produces a relatively high degree of dispersion, for a narrow band laser such as is used with a refractive or catadioptric optical lithography imaging system. As referred to above, the front optics module 212 may include line-narrowing optics (e.g., outcoupling interferometer, birefringent plate, grating, grism) as well (see the Nos. 60/166,277, 60/173,993 and 60/166,967 applications, each being assigned to the same assignee and hereby incorporated by reference).

The beam expander of the above exemplary line-narrowing optics of the optics module 210, and that of the embodiment described above in front of the output coupling interferometer 60, preferably includes one or more prisms. The beam expander may include other beam expanding optics such as a lens assembly or a converging/diverging lens pair. The grating or a highly reflective mirror is preferably rotatable and in Littrow configuration so that the wavelengths reflected into the acceptance angle of the resonator can be selected or tuned. Alternatively, the grating, or other optic or optics, or the entire line-narrowing module may be pressure tuned, such as is set forth in the No. 60/178,445 and Ser. No. 09/317,527 applications, each of which is assigned to the same assignee and is hereby incorporated by reference. The grating may be used both for dispersing the beam for achieving narrow bandwidths and also preferably for retroreflecting the beam back toward the laser tube 202. Alternatively, a highly reflective mirror may be positioned before or after the grating which receives a reflection from the grating and reflects the beam back toward the grating, such as in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, 60/124,241, 60/140,532, 60/147, 219 and 60/140,531, 60/147,219, 60/170,342, 60/172,749, 60/178,620, 60/173,993, 60/166,277, 60/166,967, 60/167, 835, 60/170,919, 60/186,096, each of which is assigned to the same assignee as the present application, and U.S. Pat. Nos. 5,095,492, 5,684,822, 5,835,520, 5,852,627, 5,856, 991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

Optics module 212 preferably includes means for outcoupling the beam 220, such as a partially reflective resonator reflector. The beam 220 may be otherwise outcoupled such as by an intra-resonator beam splitter or partially reflecting surface of another optical element, and the optics module 212 would in this case include a highly reflective mirror. The optics control module 214 preferably controls the optics modules 210 and 212 such as by receiving and interpreting signals from the processor 216, and initiating realignment or reconfiguration procedures (see the '241, '695, '277, '554, and '527 applications mentioned above).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. An excimer or molecular fluorine laser, comprising:
 a laser chamber filled with a gas mixture and including a heat exchanger and fan for circulating the gas mixture within the chamber;

a pulser module powered by a high voltage power supply;

a plurality of electrodes within the laser chamber connected to the pulser module for energizing the gas mixture;

a gas handling module coupled to the laser chamber for filling and injecting one or more components of the gas mixture into the laser chamber; and a resonator including said discharge chamber and one or more line-narrowing optics for generating an output laser beam, wherein the resonator includes an interferometer including a pair of opposing reflecting surfaces configured so that the interferometer is tuned to have a response maximum at a selected wavelength around approximately a primary spectral maximum of the beam incident upon the interferometer, and at least one sideband of the response spectrum of the interferometer is also within the spectrum of the beam incident upon the interferometer, and wherein said first and second opposing reflecting surfaces have an optical distance, n·d, therebetween over at least a portion of said incident beam cross-section, such that said sideband corresponding to a different spectral maximum than said primary spectral maximum is suppressed due to said optical distance being varied, thereby suppressing said at least one sideband around said response maximum to improve spectral purity.

2. The laser of claim 1, wherein said first of said pair of opposing reflecting surfaces is non-planar, and wherein said non-planar first reflecting surface includes a curved portion.

3. The laser of claim 2, wherein said interferometer also serves to output couple the laser beam.

4. The laser of claim 1, wherein said interferometer also serves to output couple the laser beam.

5. The laser of claim 4, further comprising a first photodetector and a beam splitter, wherein said beam splitter is positioned to reflect a portion of the beam reflected from the output coupling interferometer to said photodetector, and wherein said interferometer is tuned substantially to a maximum intensity of interference fringes reflecting therethrough.

6. The laser of claim 5, further comprising a second photodetector and a second beam splitter positioned to monitor the beam transmitted through the output coupling interferometer, wherein information detected at said second photodetector of said transmitted beam is used by a processor for maximizing an energy stability of said transmitted beam.

7. The laser of claim 4, further comprising an etalon spectrometer positioned to detect spectral information of the beam transmitting through the output coupling interferometer, wherein the output coupling interferometer is tuned to produce a maximum intensity of interference fringes of the etalon spectrometer.

8. The laser of claim 4, further comprising a position sensitive photodetector and a beam splitter, wherein said beam splitter is positioned to reflect a portion of the beam reflected from the output coupling interferometer to said position sensitive photodetector, and wherein said output coupling interferometer is tuned substantially to a maximum intensity of interference fringes reflecting therefrom.

9. The laser of claim 8, further comprising a second photodetector and a second beam splitter, wherein information detected at said second photodetector of said transmitted beam is used by a processor for maximizing an energy stability of said transmitted beam.

10. The laser of claim 8, wherein said position sensitive photodetector comprises at least two photodiodes.

11. The laser of claim 4, further comprising a housing for disposing said output coupling interferometer therein and a pressure control unit for controlling pressure within said housing and between said first and second opposing reflecting surfaces, and wherein said pressure control unit comprises an inert gas filled bellows fluidly coupled with said housing, and wherein an interior volume of said bellows is adjustable for adjusting said pressure within said bellows and within said housing and between said first and second opposing reflecting surfaces of said output coupling interferometer.

12. The laser of claim 11, wherein said output coupling interferometer is pressure tuned to substantially a maximum intracavity reflectivity.

13. The laser of claim 11, further comprising a first photodetector and a beam splitter, wherein said beam splitter is positioned to reflect a portion of the beam reflected from the output coupling interferometer to said photodetector, and wherein said interferometer is pressure-tuned substantially to a maximum intensity of interference fringes reflecting therethrough.

14. The laser of claim 11, further comprising an etalon spectrometer positioned to detect spectral information of the beam transmitting through the output coupling interferometer, wherein the output coupling interferometer is pressure-tuned to produce a maximum intensity of interference fringes of the etalon spectrometer.

15. The laser of claim 4, further comprising a beam expander before the output coupling interferometer for reducing a divergence of the beam incident at said interferometer to improve a resolution of said interferometer.

16. The laser of claim 15, wherein said beam expander comprises at least one beam expanding prism.

17. The laser of claim 15, wherein said beam expander comprises at least two beam expanding prisms.

18. The laser of claim 15, wherein said beam expander comprises a pair of lenses.

19. The laser of claim 1, further comprising a pressure control assembly for pressure tuning said interferometer.

20. The laser of claim 19, wherein said pressure control assembly comprises:

a motor drive;

a bellow filled with an inert gas; and a housing fluidly connected with the bellow and having the air-spaced interferometer therein, wherein the motor drive is configured for adjusting an interior volume of the bellow which changes the pressure in the bellow and in the housing including the pressure in an air gap of the interferometer.

21. The laser of claim 1, further comprising a first photodetector positioned to detect a portion of the beam reflecting from the interferometer.

22. The laser of claim 21, further comprising a second photodetector and a second beam splitter positioned to monitor the beam transmitted through the output coupling interferometer, wherein information detected at said second photodetector of said transmitted beam is used by a processor for maximizing an energy stability of said transmitted beam.

23. The laser of claim 1, further comprising an etalon spectrometer positioned to detect spectral information of the beam propagating from the interferometer, wherein the interferometer is tuned to produce a maximum intensity of interference fringes of the etalon spectrometer.

24. The laser of claim 1, further comprising a position sensitive photodetector and a beam splitter, wherein said beam splitter is positioned to reflect a portion of the beam propagating from the interferometer to said position sensitive photodetector.

25. The laser of claim 24, further comprising a second photodetector and a second beam splitter, wherein information detected at said second photodetector of said transmitted beam is used by a processor for maximizing an energy stability of said transmitted beam.

26. The laser of claim 24, wherein said position sensitive photodetector comprises at least two photodiodes.

27. The laser of claim 1, further comprising a housing for disposing said interferometer therein and a pressure control unit for controlling pressure within said housing and between said first and second opposing reflecting surfaces, and wherein said pressure control unit comprises an inert gas filled bellows fluidly coupled with said housing, and wherein an interior volume of said bellows is adjustable for adjusting said pressure within said bellows and within said housing and between said first and second opposing reflecting surfaces of said interferometer.

28. The laser of claim 27, wherein said output coupling interferometer is pressure tuned to substantially a maximum intracavity reflectivity.

29. The laser of claim 27, further comprising a first photodetector and a beam splitter, wherein said beam splitter is positioned to reflect a portion of the beam reflected from the output coupling interferometer to said photodetector, and wherein said interferometer is pressure-tuned substantially to a maximum intensity of interference fringes reflecting therethrough.

30. The laser of claim 27, further comprising an etalon spectrometer positioned to detect spectral information of the beam transmitting through the output coupling interferometer, wherein the output coupling interferometer is pressure-tuned to produce a maximum intensity of interference fringes of the etalon spectrometer.

31. The laser of claim 1, further comprising a beam expander before the interferometer for reducing a divergence of the beam incident at said interferometer to improve a resolution of said interferometer.

32. The laser of claim 31, wherein said beam expander comprises at least one beam expanding prism.

33. The laser of claim 31, wherein said beam expander comprises at least two beam expanding prisms.

34. The laser of claim 31, wherein said beam expander comprises a pair of lenses.

* * * * *